United States Patent [19]
Faulk

[11] Patent Number: 5,841,641
[45] Date of Patent: Nov. 24, 1998

[54] PROTECTED ZERO-CROSSING DETECTION USING SWITCHING TRANSISTOR'S ON-RESISTANCE

[75] Inventor: Richard A. Faulk, Cypress, Tex.

[73] Assignee: Compaq Computer Corporation, Houston, Tex.

[21] Appl. No.: 777,787

[22] Filed: Dec. 31, 1996

Related U.S. Application Data

[60] Provisional application No. 60/016,657 May 1, 1996.

[51] Int. Cl.$^6$ ............................................ H02M 3/335
[52] U.S. Cl. ........................... 363/21; 363/53; 363/80; 363/89
[58] Field of Search ................................ 323/907, 369, 323/284; 363/80, 53, 21, 72, 49, 89, 56; 361/18, 103

[56] References Cited

U.S. PATENT DOCUMENTS

| | | | |
|---|---|---|---|
| 4,428,015 | 1/1984 | Nesler | 361/18 |
| 4,428,016 | 1/1984 | Brasfield | 361/18 |
| 4,460,951 | 7/1984 | Fenter et al. | 363/49 |
| 5,237,262 | 8/1993 | Ashley et al. | 323/284 |

*Primary Examiner*—Shawn Riley

[57] ABSTRACT

An auxiliary power transistor which is switched in common with the primary power transistor, and which isolates the voltage-monitoring circuit when the primary power transistor is off. Thus the signal for sensing the secondary current is connected only when the power transistor is turned on, and high voltages in the sensing logic are avoided. This is particularly advantageous for systems where the turn-off times of the power transistor are sought to be synchronized with current zero-crossings. This current-zero-crossing technique may be used to detect zero-crossings of current on a secondary-side switch.

38 Claims, 13 Drawing Sheets

PROTECTED ZERO-CROSSING DETECTION USING SWITCHING TRANSISTOR'S ON-RESISTANCE

CROSS-REFERENCE TO RELATED APPLICATION

This application claims priority from provisional 60/016,657 filed May 1, 1996, which is hereby incorporated by reference. However, the content of the present application is not identical to that of the priority application.

BACKGROUND AND SUMMARY OF THE INVENTION

The present invention relates to power converters and power supplies in portable computers.

Current-Mode Feedback

It is often advantageous to use some form of current-dependent feedback to control power circuits. This is true not only in power converters (as in the presently preferred embodiment described below), but also in motor control, industrial arc melting, industrial inductive heating, very-low-frequency transmitters, and in other power control applications.

One particularly useful instance of this is in detection of a zero crossing of current. Zero crossing detection is extremely useful in switching power to inductive loads, since a near-zero current can be interrupted with little or no voltage spike, and thus snubbing of power transistors is greatly simplified (or even unnecessary).

Current monitoring, in power circuits, is often performed by introducing a small series resistor (e.g. in the range of 100 mΩ up to a few ohms) to generate a voltage which can be sensed. However, even a small series resistor wastes power and increases heat dissipation.

Protected Zero-Crossing Detection

The present application describes a new way to perform zero-crossing detection of currents in power circuits. This is done by using the on-resistance of a power field-effect transistor which is also used for switching. The value of this on-resistance is dependent on the transistor type, size, and layout, and also varies significantly from one transistor to another. However, since the objective is merely to detect a zero crossing, the particular value of the resistance used to sense current is not at all critical, and thus the on-resistance (which is somewhat unpredictable) is sufficiently precise for this purpose.

Thus when a switching transistor is on, its on-resistance can in principle be used to generate a voltage signal which can be monitored by a comparator to detect zero-crossings. However, when the switching transistor turns off, it may have to withstand voltages of well over 100 volts. Thus if a comparator is simply connected across the switching transistor, the comparator must be robust enough to withstand the full voltage rating of the power transistor. This is difficult.

The present application solves this problem by providing an auxiliary power transistor which is switched in common with the primary power transistor, and which isolates the voltage-monitoring circuit when the primary power transistor is off. Thus the signal for sensing the secondary current is connected only when the power transistor is turned on, and high voltages in the sensing logic are avoided. This is particularly advantageous for systems where the turn-off times of the power transistor are sought to be synchronized with current zero-crossings.

A particularly advantageous disclosed embodiment is a power converter where the innovative current-zero-crossing technique is used to detect zero-crossings of current on a secondary-side switch. This advantageously permits an improved control architecture as described below, and can also be used for other control architectures.

BRIEF DESCRIPTION OF THE DRAWING

The disclosed inventions will be described with reference to the accompanying drawings, which show important sample embodiments and which are incorporated in the specification hereof by reference, wherein.

DETAILED DESCRIPTION OF THE PREFERRED EMBODIMENTS

Figure 1:
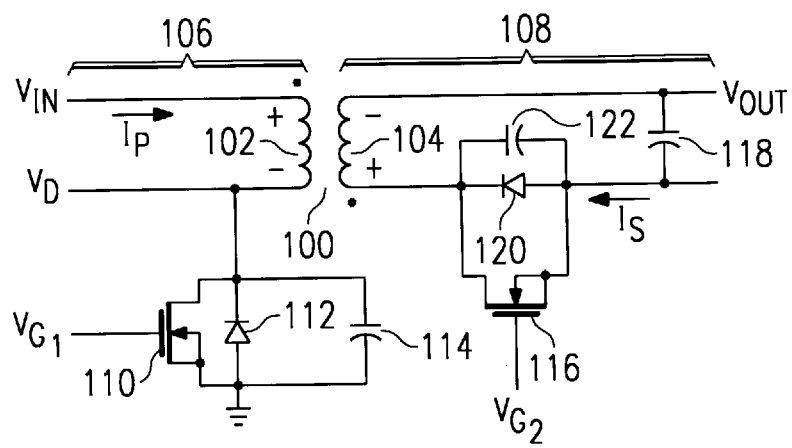
FIG. 1 is a schematic of a sample circuit in which the reciprocating converter operation is implemented.

The numerous innovative teachings of the present application will be described with particular reference to the presently preferred embodiment (by way of example, and not of limitation), in which:

Note that the on-resistance of power switch 116 (seen in FIGS. 3A and 3B) is used to find the zero crossing of the secondary current. Since the objective is merely to detect a zero crossing, the particular value of the resistance used to sense current is not at all critical, and thus the on-resistance $R_{dson}$ can be used. However, the problem is that when the switch is open it may have to withstand voltages of well over 100 Volts. Thus, the circuit of FIGS. 3A and 3B uses another power transistor 152, which is turned on only when transistor 116 is turned on. Thus the input ISNS of chip 144 is connected, and monitors the secondary current, only when the power transistor 116 is turned on, and high voltages on the input ISNS are avoided.

The power conversion system of the presently preferred embodiment, in which this feature is embedded, will now be described in great detail.

The present application discloses a reciprocating converter, in which energy is periodically fed from the secondary back into the primary. The secondary current is allowed to ramp down to negative currents before the secondary-side switch opens. When the secondary-side switch opens a negative current appears on the primary winding, and this current reduces the voltage on the primary-side switch. After the voltage on the primary-side switch has been reduced to an acceptable minimum level, the primary-side switch is then closed, and the primary current resumes ramping up.

The preferred embodiment uses two controllers: one controller for the primary switch, and one controller for the secondary switch. Each controller controls the on-off switching of its associated switch. The controller for the secondary switch is a master controller which also controls the switching signal output by the slave controller. The master controller resides in the output circuit, where the voltages are smaller, and senses the states of the flyback switched mode power supply. The master controller then turns the secondary switch on and off according to the states of the flyback converter and communicates to the slave controller when to turn on and off the primary transistor.

In the preferred embodiment, the master controller communicates with the slave controller using pulsed signals. A positive pulse directs the slave controller to turn on the primary switch. A negative pulse directs the slave controller to turn off the primary switch. Feedforward voltage control is provided to the master controller through an auxiliary secondary winding of the power transformer. The master controller also monitors the voltage across the secondary switch in order to determine when energy is being transferred back into the power transformer. The master controller then monitors the energy transferred back until sufficient energy has been transferred back to discharge the inherent capacitance of the first switch, whereby the master controller then turns off the second switch. Feedback voltage control is also provided to the master controller which monitors the output voltage of the converter.

The slave controller powers up the flyback converter. The slave controller has a power up function to power itself up. The slave controller also has a start-up waveform which is used to power up the master controller. Furthermore, the slave controller also has a watchdog timer which sets the maximum amount of time allowed to power-up the master controller before the slave controller resets itself. Once the master controller has been powered up and it communicates its status to the slave controller, the start-up waveform from the slave controller ceases, and the output of the slave controller is then controlled by the master controller. FIG. 1 illustrates the topology of the reciprocating energy flyback switched mode converter. Shown in FIG. 1 is a power transformer 100 which has a primary winding comprising a inductor 102 and a secondary winding comprising an inductor 104. Referring to a input circuit 106, $V_{IN}$, a DC input voltage, is connected to one end of inductor 102; the other end of inductor 102 is connected to the drain of a NMOS primary transistor 110; the source of transistor 110 is connected to primary side ground; the anode of a diode 112 is connected to the drain of transistor 110; the cathode of diode 112 is connected to primary side ground; a parasitic capacitance 114 lies between the drain of transistor 110 and primary side ground; and a control voltage $V_{G1}$, is connected to the gate of transistor 110. $V_D$ is the drain voltage of transistor 110 and the voltage across the parasitic capacitor 114. $V_{IN}$ is typically formed by taking an AC wall voltage, passing it through a full wave bridge rectifier, and then passing the rectified output signal of the bridge rectifier through a low pass filter. $V_{IN}$ typically ranges from 120 to 380 volts. $I_p$ is the current of inductor 102 with the orientation shown in FIG. 1. Transistor 110 is a N-type, depletion-mode MOSFET (NMOS). Transistor 110, controlled by $V_{G1}$, functions as a switch by only operating in its saturated (on) state or in its off state. Diode 112 clamps the voltage swings of $V_D$. Capacitor 114 is the parasitic rain-source capacitance of transistor 110. This capacitance is the primary source of switching loss for the power supply because of the large voltage developed across capacitor 114 during the off-time of transistor 110.

Referring to an output circuit 108, one end of a inductor 104 is connected to the drain of a NMOS transistor 116; the other end of inductor 104 is connected to one end of an output capacitor 118; the other end of capacitor 118 is connected to secondary side ground; the source of NMOS transistor 116 is connected to secondary side ground; the anode of a parasitic diode 120 is connected to the drain of NMOS transistor 116; the cathode of diode 120 is connected to secondary side ground; a parasitic capacitance 122 appears between the drain of NMOS transistor 116 and secondary side ground; and a control voltage, $V_{G2}$, is connected to the gate of transistor 116. A DC output voltage $V_{OUT}$ is the voltage across capacitor 118 with the polarity shown in FIG. 1. The secondary current, $I_S$, is the current of inductor 104 with the orientation as shown in FIG. 1. $V_{G2}$ controls the on-off switching of transistor 116. Capacitor 122 is the parasitic drain-source capacitance of transistor 116. The output capacitor 118 functions as a low pass filter and must also supply energy to the load and to the primary. Diode 120 functions both as a rectifier for the output circuit 108 and as a device to clamp the drain-source voltage swings of transistor 116. Inductor 104, diode 120, and capacitor 118 constitute the necessary components to form an output circuit of a typical flyback switched mode power supply; however, in this reciprocating energy flyback switched mode power supply, transistor 116 enables the output circuit 108 to supply energy back to the input circuit 106, thereby allowing the discharge of the drain-source capacitor 114 of transistor 110. Transistor 116 also serves another purpose. The on-state drain-source resistance, commonly denoted $RDS_{ON}$, of transistor 116 is significantly lower than the resistance of diode 120. Thus, the parallel combination of the diode resistance and the drain source resistance, $RDS_{ON}$, of transistor 116 lowers the effective switch resistance of output circuit 108 and improves the efficiency of the converter.

Figure 2:
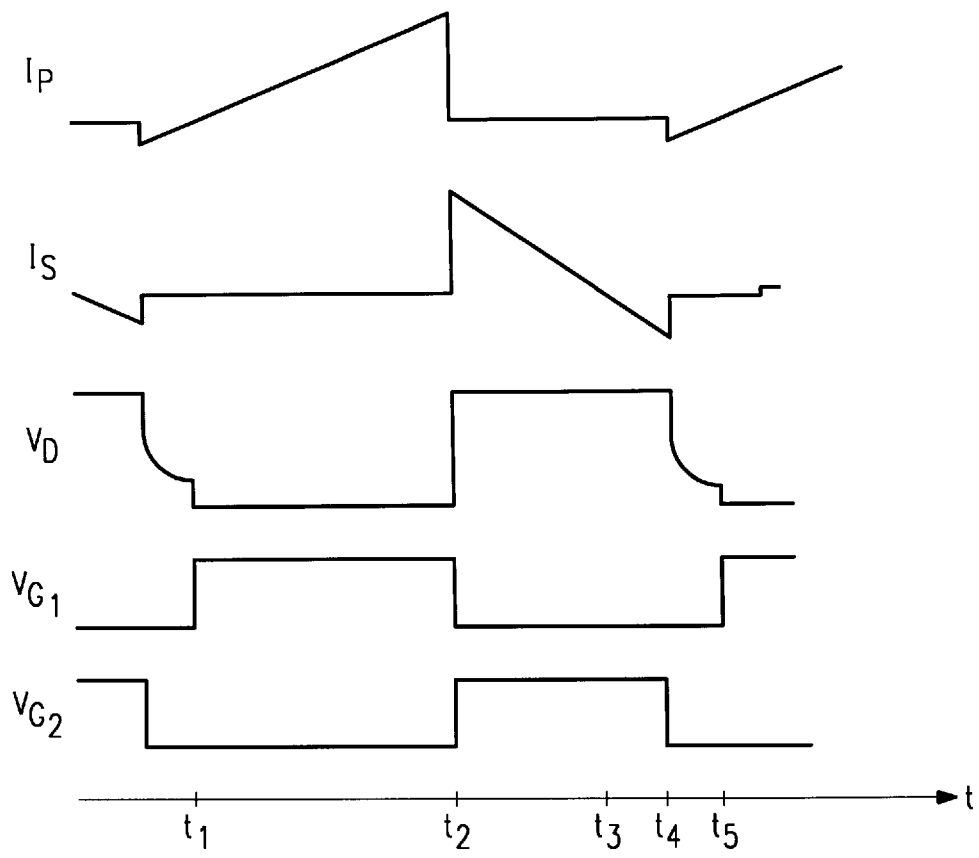
FIG. 2 illustrates the waveforms present in a reciprocating energy flyback switched mode power supply.

FIG. 2 illustrates the currents and voltages of the reciprocating energy flyback switched mode power supply. The following is a discussion of one switching cycle, from time t1 until time t5, of transistor 110 and transistor 116. At time t1, transistor 110 is turned on by its gate voltage, $V_{G1}$. As shown in FIG. 2, during the time from t1 until time t2, $I_p$ ramps upward due to the DC voltage, $V_{IN}$, which exists across inductor 102. The drain voltage of transistor 110, $V_D$, during this time period is approximately zero volts. Furthermore, during the time from t1 until t2, there is no secondary current, $I_S$. This is attributable to transistor 116 being turned off and the drain voltage of transistor 116 being positive, thereby reverse biasing diode 120. Although $I_p$ is initially negative, which will be discussed below, the positive primary current, $I_p$, stores energy in the magnetic field of transformer 100 during the time from t1 until time t2. (Delay T1 helps to ensure that $I_S$ has started up before the synchronous rectifier has turned on.)

After a sufficient time has elapsed, discussed further below, $V_{G1}$ turns off transistor 110 at time t2. At this time the voltage of capacitor 114 changes from approximately zero volts to a voltage equal to the summation of the input voltage, $V_{IN}$, and the reflected output voltage present at the primary of transformer 100. After $V_{G1}$ has turned off transistor 110, $V_{G2}$, after a short delay not shown in FIG. 2, then turns transistor 116 on. Once transistor 110 has turned off, diode 120 provides the initial switching action for the output circuit, thereby allowing a positive secondary current, $I_S$. During time t2 to time t3, $I_S$ ramps downward, thereby transferring energy stored in the magnetic field of transformer 100 to output capacitor 118 which completes the transfer of energy from the input circuit 106 to the output circuit 108. Thus, during time t2 to time t3, energy stored in the magnetic field of transformer 100 from time t1 to time t2 is transferred to output capacitor 118.

In an ordinary flyback switched mode power supply, at time t3 diode 120 would turn off and transistor 110 would turn on, thereby transferring energy once again from the input circuit 106 to the output circuit 108. However, this is a point where the reciprocating energy flyback switched mode power supply particularly differs from a standard flyback switched mode power supply. Once the energy stored in the magnetic field of transformer 100 has been transferred to capacitor 118, some energy from capacitor 118 is then transferred back to transformer 100. This energy transferred back is used to discharge capacitor 114 before transistor 110 is switched on. As previously discussed, the discharging of capacitor 114 before switching on transistor 110 greatly reduces the switching power loss dissipated by transistor 110. As shown in FIG. 2, from time t3 until time t4, $I_S$ is negative, thereby storing energy in the magnetic field of transformer 100.

At time t4, transistor 116 turns off. Diode 120 also remains turned off because the drain voltage of transistor 116 is positive. Thus, there is no secondary current, and $I_S$ is forced to zero from time t4 until time t2 on the next cycle; and therefore, at time t4, the output capacitor 118 has completed transferring sufficient energy to transformer 100. During the time t4 until time t5, energy stored in the magnetic field of transformer 100 discharges the parasitic drain-source capacitor 114. This discharge of energy from capacitor 114 drops the voltage across capacitor 114, $V_D$, to near zero. In the preferred embodiment, with an input voltage ranging from 120 to 360 volts, $V_D$ would drop to about 30 volts for maximum efficiency. (Peak efficiency does not necessarily come at VD=0V; below 30V the energy stored in capacitance 114 is small compared to the losses incurred in extracting it.)

At time t5, transistor 110 is once again switched on, thereby starting another switching cycle. Primary current $I_p$, at time t4, has an initial value which is negative. At times t1 and t5 $I_p$ is ideally zero, and allows switching at the minimum VD.

In order to ensure proper control, several states of the circuit shown in FIG. 1 must be monitored. The primary current $I_p$, can be monitored by a current sensor, such as a resistor, coupled in series with the primary winding; can be monitored through an auxiliary winding of the power transformer 100; or can be estimated by monitoring the elapsed time from time t1 when transistor 110 is first turned on. The secondary current, $I_S$, can be monitored by a current sensor, such as a resistor, coupled in series with the secondary winding 108; can be monitored through an auxiliary winding of the power transformer 100; or can be estimated by monitoring the elapsed time from time t2 when transistor 116 is first turned on. The drain voltage of transistor 110, $V_D$, can be monitored by an auxiliary winding of transformer 100; or can be estimated by monitoring the elapsed time from time t4 when transistor 116 is switched off and predicting $V_D$ based on a L–C natural oscillation period of inductor 104 and capacitor 114. The drain voltage of transistor 116, which can be used to detect when $I_S$ goes negative, can be monitored through an auxiliary winding of transformer 100. Furthermore, the input voltage, $V_{IN}$, can be monitored through an auxiliary winding of transformer 100.

Both transistors 110 and transistor 116 have a separate controller in order to generate the control signals, $V_{G1}$ and $V_{G2}$, respectively. The controllers may operate independently of one another, or one controller may be dependent on the signals generated by the other controller. If the two controllers operate independently of one another, each controller must monitor the states of the power supply in order to determine the appropriate switching times. If the two controllers interact with each other, one controller operates a master controller, and one operates as a slave controller. The master controller monitors the states of the converter; generates a first control signal for its transistor; and communicates a command signal to the slave controller which generates a second control signal in response to the command signal.

In one embodiment, both transistor 110 and transistor 116 have separate independent controllers. The controller for transistor 110 must determine when to turn transistor 110 on. As can be seen from FIG. 2, this occurs at time t1. At time t1 capacitor 114 has been sufficiently discharged, $I_p$ is zero, and $V_D$ has reached a sufficiently low voltage. As illustrated in FIG. 2, $V_D$ levels off as it approaches its minimum. The controller for transistor 110 must sense when the capacitor 114 voltage, $V_D$, has dropped below this low voltage threshold. $V_D$ can be monitored several different ways. The controller for transistor 110 could sense the negative rate of change of the drain voltage, $V_D$; sense the point at which the rate of change of $V_D$ equals zero; sense the point at which $V_D$ has passed below the low threshold value; or, measure a fixed delay time, equal to the period of a natural LC oscillation. Once $V_D$ has reached its low voltage threshold, $V_{G1}$ goes high, thereby switching on transistor 110.

In the independent controller embodiment, once transistor 110 has been switched on, the controller for transistor 110 must then determine when to turn transistor 110 off. This would occur, at time t2, when $I_p$ has reached the appropriate peak value according to common practice. There are several ways to determine when $I_p$ has reached this threshold. One way is to monitor the primary current $I_p$, for the threshold value. Another way is to determine at what time transistor 110 has switched on and then measure a fixed delay before switching transistor 110 off, which would allow $I_p$ to reach the desired value. When the controller for transistor 110 determines that $I_p$ has reached its peak value, the controller for transistor 110 asserts $V_{G1}$ low, thereby turning off transistor 110.

Still referring to the independent controller embodiment, in order to turn transistor 116 on, the controller for transistor 116 must determine when transistor 110 has turned off.

There are several ways to do this. One method is to monitor the drain voltage of transistor 116. The drain voltage of transistor 116 goes negative after transistor 110 turns off and capacitor 122 discharges. Another way to determine when transistor 110 has turned off is to monitor the voltage across inductor 104 as measured by the polarity indicated in FIG. 1. When the voltage across inductor 104, goes positive, this indicates inductor 104 is now discharging, thereby indicating that transistor 110 has turned off. Another way to determine if transistor 110 has turned off is to sense the inductor 104 current, $I_S$. When $I_S$ goes positive, transistor 110 has turned off. When the controller for transistor 116 determines that transistor 110 has turned off, then the controller asserts $V_{G2}$ high, thereby turning on transistor 116.

Finally, when independent controllers are employed, the controller for transistor 116 must then sense when to assert $V_{G2}$ low, thereby turning off transistor 116. As previously discussed, during the time t3 to t4, energy is transferred from the output circuit 108 back into the transformer 100. The controller for transistor 116 must wait an appropriate time for sufficient energy to transfer to transformer 100. The controller for transistor 116 must detect or estimate when the secondary current $I_S$ has dropped below zero, and after this zero crossing, $I_S$ is allotted a fixed time to transfer energy to the transformer 100. This delay is proportional to the input-to-output voltage ratio.

Alternatively, it is also possible to measure $I_S$, and turn off switch 116 when $I_S$ reaches a sufficient negative amplitude (in relation to Vin).

Alternatively, dependent controllers can be employed, where a master controller is used in conjunction with a slave controller. The master controller may reside in either the input circuit 106, thereby controlling transistor 110, or in the output circuit 108, thereby controlling transistor 116. The slave controller would control the other transistor, transistor 110 or transistor 116. The master controller monitors the states of the circuit in which it resides and sends a signal to the slave controller directing the slave controller to turn its associated transistor on or off.

Figure 3A:
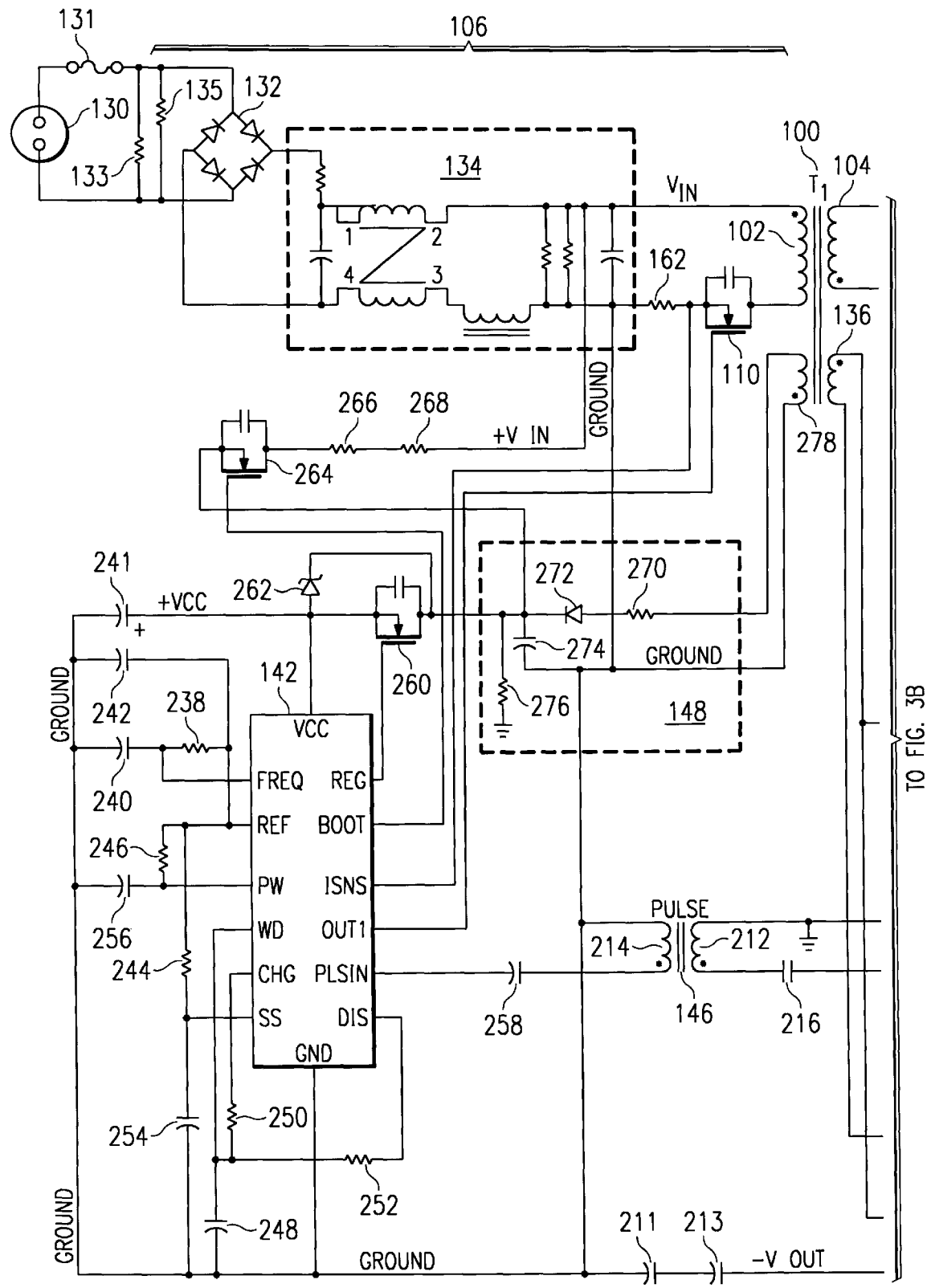
FIG. 3A and 3B are two parts of a single schematic of the preferred embodiment.
Figure 3B:
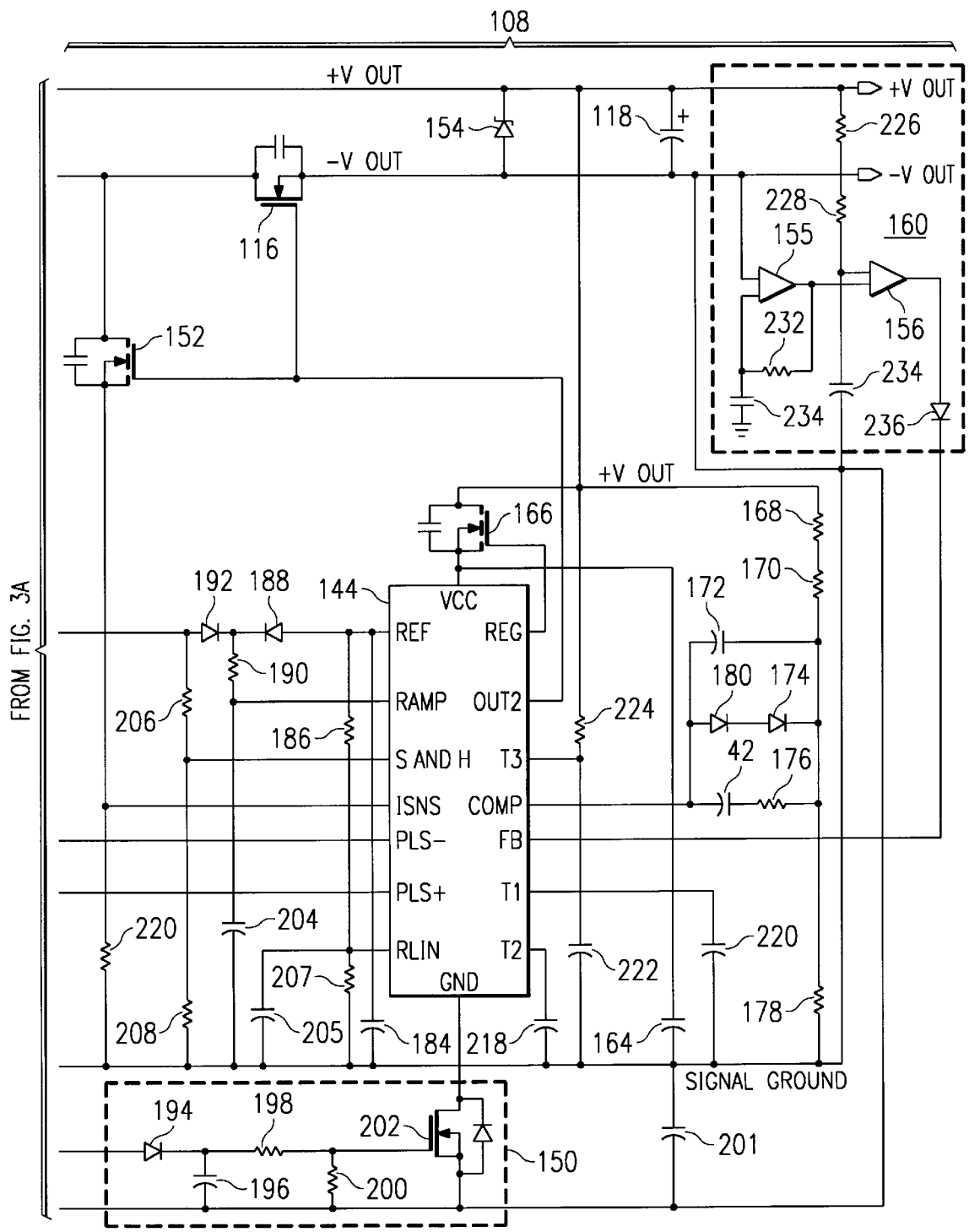

Referring now to FIGS. 3A and 3B, the preferred embodiment employs a master controller 144 to control transistor 116 and a slave controller 142 to control transistor 110. Due to the lower voltages present in the output circuit 108, in the preferred embodiment, the master controller 144 resides in the output circuit 108 and the slave controller 142 resides in the input circuit 106. Referring to the input circuit 106, an AC voltage source 130 is connected to an input fuse 131; the other end of input fuse 131 is connected to the AC input of a bridge rectifier 132, one end of a resistor 133 and one end of a resistor 135; the other end of resistor 133 is connected to primary side ground; and the other end of resistor 135 is connected to primary side ground. The DC output of the bridge rectifier 132 is connected to the input of a low pass filter 134 which contains inductors, resistors and capacitors in an arrangement commonly known to those skilled in the art; the output of low pass filter 134 is connected to one end of inductor 102; the other end of inductor 102 is connected to the drain of transistor 110; the source of transistor 110 is connected to a current sense resistor 162; the gate of transistor 110 is connected to an output signal OUT1, generated by slave controller 142; and the other end of current sense resistor 162 is connected to primary side ground.

Referring to output circuit 108, one end of inductor 104 is connected to output capacitor 118, the anode of a Zener diode 154 and the input of a voltage feedback control network 160; the other end of inductor 104 is connected to the drain of transistor 116 and the drain of a transistor 152; the source of transistor 116 is connected to secondary side ground; the gate of transistor 116 is connected to an OUT2 signal generated by master controller 144; and the cathode of Zener diode 154 is connected to secondary side ground.

Note that the on-resistance of power switch 116 is used to find the zero crossing of the secondary current. Since the objective is merely to detect a zero crossing, the particular value of the resistance used to sense current is not at all critical, and thus the on-resistance $R_{dson}$ can be used. However, the problem is that when the switch is open it may have to withstand voltages of well over 100 Volts. Thus, the circuit of FIGS. 3A and 3B are uses another power transistor 152, which is turned on only when transistor 116 is turned on. Thus the input ISNS of chip 144 is connected, and monitors the secondary current, only when the power transistor 116 is turned on, and high voltages on the input ISNS are avoided. Note that transistors 116 and 152 are both VDMOS power transistors, in the presently preferred embodiment, and VDMOS technology is not used in chip 144.

Shown in FIG. 3 is master controller 144 and slave controller 142. The master controller 144 communicates to slave controller 142 through an additional reactance 146 (which in this embodiment is a pulse transformer). The master controller 144 monitors the zero-crossing of the secondary current, $I_S$, through transistor 152 and monitors the DC input voltage, $V_{IN}$, through an auxiliary winding 136. As discussed below, auxiliary winding 136 is also utilized by slave controller 142 to power-up the master controller 144 by connecting SIGNAL GROUND to secondary side ground through a clamping circuit 150.

Referring now to the master controller 144, the master controller 144 includes the following inputs and outputs:

REF, an internally generated reference signal;

RLIM, an input signal that limits the on-time of transistor 110;

RAMP, an input signal governed by feedforward voltage control for providing a timing signal which governs the on-time of transistor 110;

S&H, an input subject to feedforward voltage control which governs the time during which energy is transferred from capacitor 118 to transformer 100 when $I_S$ goes negative;

PLS−, a pulsed output signal used to communicate to slave controller 142 to turn off transistor 110;

PLS+, a pulsed output signal used to communicate to slave controller 142 to turn off transistor 110;

T2, an input signal used to generate a delay between the switching off of transistor 110 and the switching on of transistor 116, thereby allowing capacitor 122 to discharge;

T1, an input signal used to establish the on-time of transistor 116;

FB, the voltage feedback input signal connected to feedback network 160;

COMP, an external compensation pin;

T3, an input timing signal used to establish the discharge time of capacitor 114;

OUT2, the $V_{G2}$ control signal used to control transistor 116; and

REG, an output used to linearly regulate $V_{CC}$, the supply voltage of master controller 144. The operations of master controller 144 will be discussed in further detail with the discussions of FIG. 4 and 5.

Referring now to the external connections of master controller 144, the RLIM input is connected to one end of a resistor 186, one end of a resistor 207 and one end of a capacitor 205; the other end of resistor 186 is connected to REF; the other end of capacitor 205 is connected to a SIGNAL GROUND; and the other end of resistor 207 is connected to SIGNAL GROUND. The RAMP input is connected to one end of a resistor 190 and one end of a capacitor 204; the other end of capacitor 204 is connected to SIGNAL GROUND; the other end of resistor 190 is connected to the anode of a diode 192 and the anode of a diode 188; the cathode of diode 188 is connected to REF; the cathode of diode 192 is connected to one end of an auxiliary winding 136, one end of a resistor 206 and the input of a clamping circuit 150; and the other end of auxiliary winding 136 is connected to SIGNAL GROUND.

Thus diode 192 provides a component which corresponds to Vin, and diode 188 provides a component which corresponds to a 5V reference. The combination of these two diodes provides a variable-frequency operation which is dependent on Vin for higher values of Vin, but which is clamped to a fixed minimum frequency at lower values of Vin. This is one of the features which enables the converter of the presently preferred embodiment to operate at any input voltage from 400V down to 50V or less.

The S&H input is connected to one end of a resistor 206 and one end of a resistor 208; the other end of resistor 206 is connected to one end of the auxiliary winding 136, the cathode of diode 192 and the input of clamping circuit 150; and the other end of resistor 208 is connected to SIGNAL GROUND. The ISNS input is connected to the source of transistor 152 and one end of a resistor 210; the other end of resistor 210 is connected to SIGNAL GROUND; the gate of transistor 152 is connected to the OUT2 output; and the drain of transistor 152 is connected to one end of inductor 104 and the drain of transistor 116. The PLS-output is connected to ground. The PLS+ output is connected to one side of a capacitor 216; the other side of capacitor 216 is connected to one side of a primary winding 212 of a pulse transformer 146; and the other side of primary winding 212 is connected to secondary side ground. The ground input to the master controller 144 is connected to SIGNAL GROUND. The T2 input is connected to a capacitor 218 with the other side of capacitor 218 connected to SIGNAL GROUND. The Ti input of the master controller 144 is connected to a capacitor 220 with the other side of capacitor 220 connected to SIGNAL GROUND. The FB input is connected to one end of a resistor 176, one end of a resistor 178, the output of the feedback network 160, one end of a resistor 170, one end of a capacitor 172, and the anode of a diode 174; the other end of resistor 178 is connected to ground; the other end of resistor 170 is connected to a resistor 168 with the other end of resistor 168 connected to $V_{OUT}$. The COMP input is connected to the cathode of a diode 180, one end of a capacitor 172, and one end of a capacitor 182; the other end of capacitor 172 is connected to the FB input; the other end of capacitor 182 is connected to one end of a resistor 176; the anode of diode 180 is connected to the cathode of a diode 174; the other end of resistor 176 is connected to the FB input; and the anode of diode 174 is connected to the FB input. The T3 input is connected to one end of a capacitor 222 and one end of a resistor 224; the other end of resistor 224 is connected to $V_{OUT}$; and the other end of capacitor 222 is connected to SIGNAL GROUND. The OUT2 output is connected to the gate of transistor 116 and the gate of transistor 152. The REG output is connected to the gate of a transistor 166; the source of transistor 166 is connected to the supply voltage input; and the drain of transistor 166 is connected to $V_{OUT}$.

Diodes 174 and 180 prevent saturation of the comparison network. This is particularly advantageous in the presently preferred embodiment, where the small input capacitor means that the power converter is (in effect) powered down, and then started up again, twice in every cycle of the mains voltage. These diodes help to prevent overshoot, and provide rapid convergence on target values, when the converter is started up after such an interruption.

Clamping circuit 150 clamps the SIGNAL GROUND of the master controller 144 to the ground of output circuit 108, thereby enabling master controller 144 to power up. The input to clamping circuit 150 is provided by auxiliary winding 136. Referring to clamping circuit 150, the cathode of a diode 194 is connected to one end of auxiliary winding 136; the anode of diode 194 is connected to one end of a capacitor 196 and one end of a resistor 198; the other end of capacitor 196 is connected to secondary side ground; the other end of resistor 198 is connected to the gate of an N-type transistor 202 and one end of a resistor 200; the other end of resistor 200 is connected to secondary side ground; the drain of transistor 202 is connected to SIGNAL GROUND; and the source of transistor 202 is connected to secondary side ground. (This transistor allows the circuitry to be isolated from the output, so that no current is drawn from the Vout terminal when the circuitry is turned off.)

When the power supply is first turned on, the master controller 144 is disabled because SIGNAL GROUND is not connected to secondary side ground. In order to power up master controller 144, slave controller 142 generates a start-up waveform, consisting of pulses, which charge capacitor 196. Because capacitor 192 and diode 194 function as a peak detector, capacitor 196 remains charged when the voltage from auxiliary winding 136 goes low. The voltage of capacitor 196 turns on transistor 202, thereby clamping SIGNAL GROUND to the secondary side ground. Once master controller 144 has powered up and communicates this fact to slave controller 142 by sending slave controller 142 a negative pulse, as explained later, slave controller 142 terminates the start-up waveform. Capacitor 196 is then kept charged by the voltage present on auxiliary winding 136 during the normal operation of the power supply.

Feedback network 160 consists of an amplifier 155 with one input connected to ground; the other input of amplifier 134 is connected to one end of a resistor 230 and one end of a resistor 232; the other end of resistor 230 is connected to ground; the other end of resistor 232 is connected to the output of amplifier 155 and one input of an error amplifier 156. One input of error amplifier 156 is connected to the output of amplifier 155; the other input of error amplifier 156 is connected to one end of a resistor 228 and one end of a capacitor 234; the other end of resistor 228 is connected to one end of a resistor 226; the other end of resistor 226 is connected to $V_{OUT}$; the other end of capacitor 234 is connected to SIGNAL GROUND; and the output of error amplifier 156 is connected to the cathode of a diode 236 which has its anode connected to the FB input of the master controller 144. The feedback voltage control of master controller 144 is discussed in more detail below with the discussion of FIG. 6.

The master controller 144 must monitor the states of the output circuit 108 in order to properly control the operation of the flyback converter. Referring to FIGS. 2 and 3A/3B, transistor 152 is employed to monitor the drain voltage of transistor 116 during the on-time of transistor 116. When the secondary current, $I_S$, drops to zero at time t3, the transistor 116 drain voltage goes positive. Thus, as discussed in more detail below, transistor 152 allows the master controller 144 to detect the zero crossing of $I_S$. Auxiliary winding 136 allows feedforward voltage control for the master controller 144. As discussed further below, this feedforward voltage control arrangement allows the master controller 144 to directly adjust $V_{OUT}$ for changes in $V_{IN}$ without relying on the feedback control network 160, thereby increasing the dynamic response time of the master controller 144 to changes in $V_{IN}$.

The slave controller 142 uses the following inputs and outputs:

FREQ is an input which governs the frequency of a start-up waveform produced by slave controller 142 to power up master controller 144;

REF is an internally generated reference voltage;

WD is an input governing watchdog operations of the slave controller 142;

SS is an input governing a soft start feature of slave controller 142;

PW is an input setting the maximum duty cycle of the start-up waveform;

CHG is an input which establishes a watchdog timeout period;

DIS is an input which establishes a watchdog reset period;

PLSIN is an input through which slave controller 142 receives a command signal from the master controller 144;

OUT1 provides the $V_{G1}$ control signal used to control transistor 110;

ISNS is an input which provides instantaneous high-speed overcurrent protection;

BOOT is an output to an external N-type, depletion mode MOSFET transistor used to connect $V_{IN}$ to the voltage supply of slave controller 142 during power up of the slave controller 142; and REG is an output to an external N-type, depletion mode MOSFET used to regulate the slave controller 142 supply voltage. The operations of slave controller 142 are discussed in more detail below with the discussion of FIG. 7.

Referring now to the connections of slave controller 142, FREQ is connected to one end of a resistor 238 and one end of a capacitor 240; the other end of capacitor 240 is connected to primary side ground; and the other end of resistor 238 is connected to REF. WD is connected to one end of a capacitor 248, one end of a resistor 250, and one end of a resistor 252; the other end of capacitor 248 is connected to primary side ground; the other end of resistor 250 is connected to CHG; and the other end of resistor 252 is connected to DIS. SS is connected to one end of a resistor 244 and one end of a capacitor 254; the other end of capacitor 254 is connected to primary side ground; and the other end of resistor 244 is connected to REF. PW is connected to one end of a resistor 256 and one end of a capacitor 257; the other end of capacitor 257 is connected to primary side ground; and the other end of resistor 256 is connected to REF. CHG is connected to a resistor 250 and the other end of resistor 250 is connected to WD. DIS is connected to one end of a resistor 252 and the other end of resistor 252 is connected to WD. PLSIN is connected to one end of a capacitor 258; the other end of capacitor 258 is connected to one end of a secondary winding 214 of the pulse transformer 146; and the other end of secondary winding 214 is connected to primary side ground. OUT1 is connected to the gate of transistor 110. ISNS is connected to one end of resistor 252 and the source of transistor 110. BOOT is connected to the gate of a N-type, depletion mode MOSFET, transistor 264; the source of transistor 264 is connected to the output of a peak detector circuit 148; the drain of transistor 264 is connected to one end of a bleed resistor 266; the other end of bleed resistor 266 is connected to one end of a bleed resistor 268; and the other end of bleed resistor 268 is connected to $V_{IN}$. REG is connected to the gate of a N-type, depletion mode MOSFET, transistor 260; the source of transistor 260 is connected to the slave controller 142 supply voltage; the drain of transistor 260 is connected to the anode of a Zener diode 262 and the output of the peak detector circuit 148; and the cathode of Zener diode 262 is connected to the supply voltage for slave controller 142.

During power up, power is supplied to the slave controller 142 through bleed resistor 268 and bleed resistor 266. The peak detector circuit 148 supplies power to the slave controller 142 after the slave controller 142 has powered up. The input of peak detector circuit 148 is connected to a primary auxiliary winding 278. A Zener diode 272 ensures a capacitor 274 will not be discharged during the off-time of transistor 110. One end of auxiliary winding 278 is connected to one end of a resistor 270 and the other end of auxiliary winding 278 is connected to primary side ground; the other end of resistor 270 is connected to the cathode of diode 272; the anode of diode 272 is connected to one end of capacitor 274, one end of a resistor 276, the anode of Zener diode 262, and the drain of transistor 260; the other end of capacitor 274 is connected to primary side ground; the other end of resistor 276 is connected to primary side ground; and the cathode of Zener diode 262 is connected to the supply voltage for slave controller 142.

Figure 4:
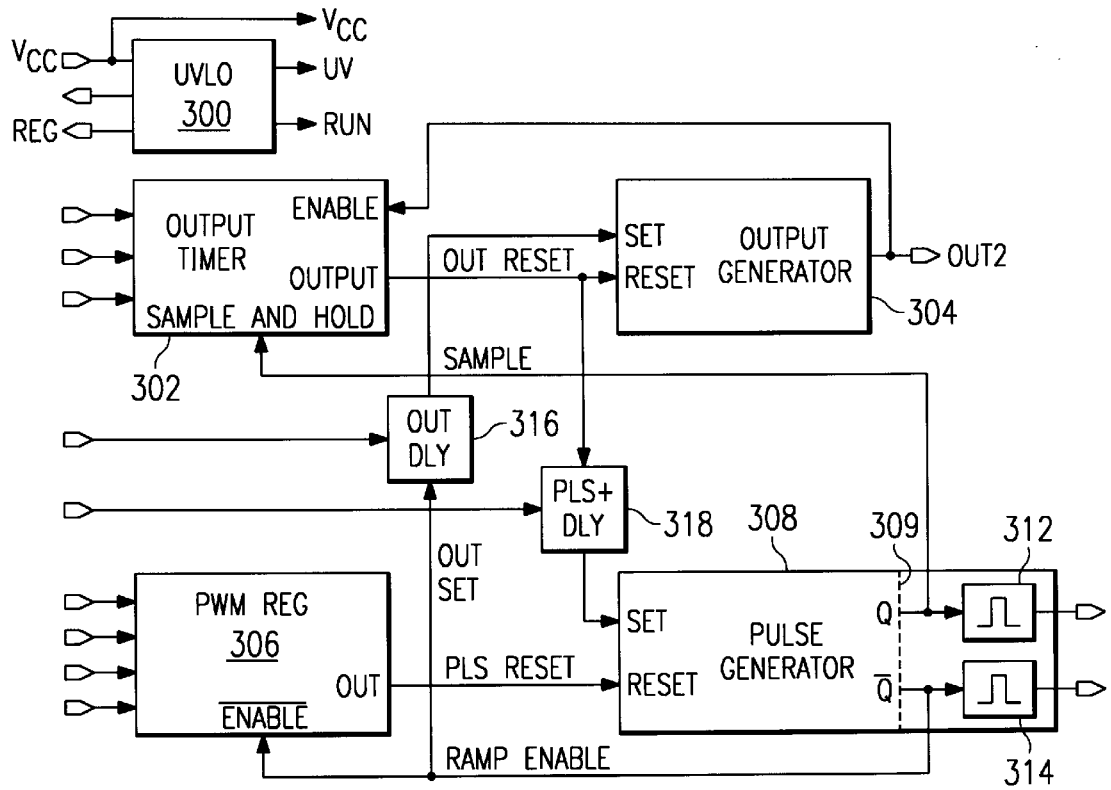
FIG. 4 is a block diagram of master controller 144.

FIG. 4 is a block diagram of master controller 144 which will lead to a better understanding of the operations of the master controller. Shown in FIG. 4 is a pulse generator 308, a pulse width modulation (PWM) regulator 306, an output generator 304, an output timer 302, and an undervoltage lockout section (UVLO) 300.

As shown in FIG. 4, the pulse generator 308 contains a set-reset latch 309, a monostable multivibrator 312, and a monostable multivibrator 314. The non-inverted output of latch 309 is connected to monostable multivibrator 312 and the SAMPLE & HOLD input of output timer 302, whose input signal is SAMPLE. The output of monostable multivibrator 312 provides the signal PLS+. The inverted output of latch 309 is connected to monostable multivibrator 314 which provides the signal PLS-; the inverted ENABLE input of PWM 306, whose input signal is RAMP ENABLE; and the input of a delay 316, whose input signal is OUT SET. The SET input of pulse generator 308 is connected to the output of a PLS+ delay 318; and the RESET input of pulse generator 308, whose input signal is PLS RESET, is connected to the output of PWM 306.

PWM 306 has four inputs: FB, COMP, RAMP, and RLIM. The output of PWM 306 is connected to the RESET input of pulse generator 308; and the ENABLE input of PWM 306 is connected to the inverted output of latch 309. PLS+ delay 318 is a delay controlled by input T2. The input to PLS+ delay 318 is connected to the output of output timer 302 and the RESET input of output generator 304. The output of PLS+ delay 318 is connected to the SET input of the pulse generator 308. An out delay 316 is another delay whose delay period is controlled by input T1. The output of delay 316 is connected to the SET input of output generator 304. The signal input of delay 316 is connected to the inverted output of pulse generator 308.

The output timer 302 has three external inputs: ISNS, S&H, and T3. The ENABLE input of the output timer 302 is connected to the output of output generator 304, which generates the OUT2 signal; a SAMPLE & HOLD input of output timer 302, whose input is the SAMPLE signal, is connected to the non-inverted output of latch 309; and the output of output timer 302 is connected to the RESET input of the output generator 304, whose reset input signal is OUT RESET.

The SET input of output generator 304 is connected to the output of delay 316; the RESET input of output generator 304 is connected to the input of delay 318 and the output of the output timer, which generates the OUT RESET signal; and the output of output generator 304 provides the OUT2 signal.

The undervoltage lock out section (UVLO) 300 has two external outputs: REF, reference voltage and REG, the supply voltage regulator signal. The UVLO 300 generates two internal enable signals, a UV signal and a RUN signal.

Now turning to the operations of master controller 144, pulse generator 308 generates PLS+ and PLS-, the two outputs which direct slave controller 142 to turn on and off, respectively, transistor 110. As can be seen from FIG. 4, the pulse generator 308 consists of pulse latch 309, the output of which controls two monostable multivibrators: one for PLS+ and one for PLS-. When the non-inverted output of pulse latch 309 undergoes a low-to-high transition, the rising edge of the output triggers monostable multivibrator 312 to assert PLS+ which enables PWM 306. PWM 306 then establishes the delay between the PLS+ pulse and the PLS-pulse. When PWM 306 is enabled by the assertion of PLS+, PLS RESET is initially low. Thus, the time between the enabling of PWM 306 and the assertion of PLS RESET, which resets pulse latch 309, governs the on-time of transistor 110. When PWM 306 resets pulse latch 308 by asserting PLS RESET, the inverted output of pulse latch 309 undergoes a low-to-high transition which triggers monostable multivibrator 314 to assert the PLS-signal which directs slave controller 142 to turn off transistor 110.

The on-time of transistor 110 is subject to voltage feedback control. As discussed further in the discussion of FIG. 6, an error amplifier 400 inside PWM 306 provides an error voltage, ERROR, which is the difference of the FB input signal and REF. This error voltage, ERROR, is compared with the RAMP input. The time delay produced by PWM 306 is equal to the time from when the RAMP ENABLE signal goes low until the RAMP input voltage reaches the ERROR signal. Thus, for example, a low $V_{OUT}$ would generate a larger ERROR signal which would, in turn, generate a longer delay between PLS- and PLS+, thereby increasing the on-time of transistor 110. The maximum on-time of transistor 110 is set by the RLIM input. The COMP input to PWM 306 allows for external selection of gain and frequency compensation of error amplifier 400.

Just as PLS- and PLS+ govern the switching of transistor 110, the output signal of output generator 304, OUT2, governs the switching of transistor 116. OUT2 is the gate voltage of transistor 116. OUT2 is asserted by slave controller 142 a fixed time delay established by delay 316 after PLS- is asserted, thereby ensuring transistor 110 is turned off before transistor 116 is turned on. This ensures that the parasitic capacitor 122 has time to discharge. Thus, given the low voltages in the output circuit 108 and the time allowed for capacitor 122 to discharge, transistor 116 introduces minimal switching power loss. Once transistor 116 is turned on by output generator 304, the on-time of transistor 116 is governed by output timer 302.

As shown in FIG. 4, when OUT SET is asserted, thereby indicating the turning off of transistor 110, OUT2 is asserted after a fixed time delay introduced by out delay 316. OUT SET goes high when PLS- is asserted, thereby turning off transistor 110. Out delay 316 sets the fixed time delay between the turning off of transistor 110 and the turning on of transistor 116, thereby allowing the parasitic drain-source capacitance of transistor 116, capacitor 122, to discharge before transistor 116 is turned on.

Output timer 302 governs the on-time of transistor 116. As shown in FIG. 4, the output timer 302 is enabled when OUT2 is asserted, and the signal OUT RESET, initially low when OUT2 is asserted, resets output generator 304 by going high after a delay introduced by output timer 302. As discussed further below in the discussion of FIG. 5, this delay consists of an internal fixed delay and a delay governed by the ISNS input. The internal fixed delay allows the ISNS input to stabilize below zero volts. In the present embodiment, the delay governed by the ISNS input is the time during which energy is transferred from output circuit 108 back into the magnetic field of transformer 100, thereby allowing sufficient energy to be transferred back into input circuit 106 to discharge capacitor 114. ISNS goes positive when $I_p$ goes negative. This occurrence triggers a delay based upon the comparison of the input signal S&H and the ramp input signal T3. As will be discussed in more detail in the discussion of FIG. 5, the SAMPLE & HOLD input of output timer 302 is enabled when SAMPLE goes high which occurs when transistor 110 is turned on. The output of output generator 304, OUT2, remains high during the transfer of energy from transformer 100 to output capacitor 118 and continues to remain high during the reverse transfer of energy from output capacitor 118 to transformer 100, whereby the time of which is governed by the ISNS delay of output timer 302. After this delay, OUT RESET is asserted, and OUT2 goes low, thereby turning off transistor 116. When OUT2 is negated, thereby turning off transistor 116, the PLS+ signal is then asserted by pulse generator 308 after a fixed time delay introduced by PLS+ delay 318. This delay is set by capacitor 144 connected to the T2 input of out delay 316.

Also shown in FIG. 4 is the undervoltage lockout device (UVLO) 300. UVLO 300 provides regulation, monitoring and protection for the supply voltage; reset control for master controller 144; and provides a precision, regulated reference voltage, REF. During master controller power up, the undervoltage signal UV is low. An internal reference regulator, which produces the reference voltage, REF, and the other functional blocks of the master controller 144, are not powered up until UV is asserted. UVLO 300 monitors the supply voltage until the supply voltage reaches a start-up voltage $V_{CCST}$, thereby inhibiting improper operation of master controller 144. Once the supply voltage reaches $V_{CCST}$, UV is asserted and the REF regulator is powered up; however, the functional blocks of master controller 144 are still not enabled at this point. Once REF reaches its threshold voltage $V_{RTH}$, UVLO 300 then asserts the RUN signal high, which enables the functional blocks of the master controller 144 and enables the REG output. The REG output controls the gate of an external, N-type, depletion mode MOSFET, transistor 166, which is used to regulate the supply voltage (see FIGS. 3A/3B).

Figure 5:
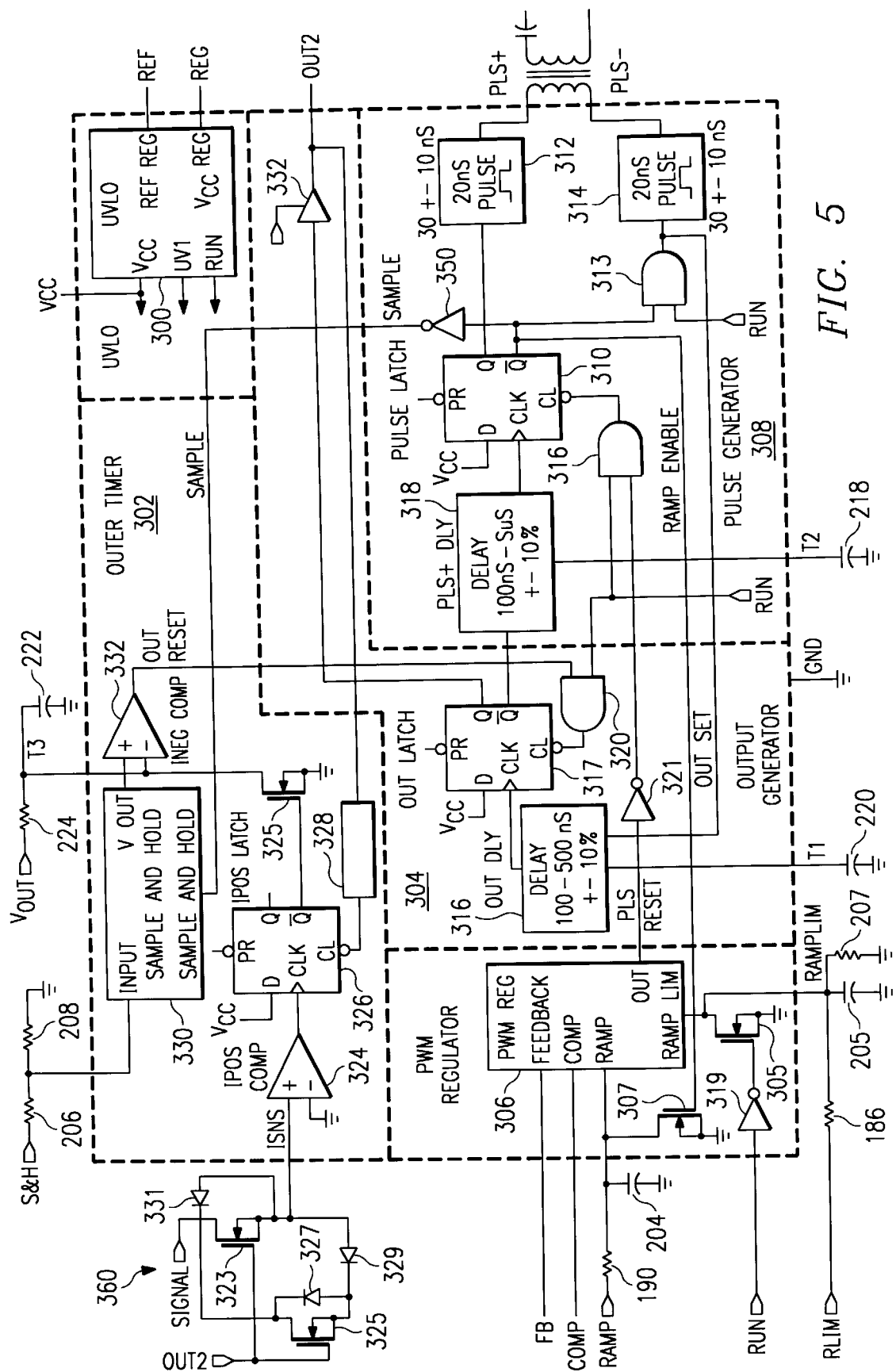
FIG. 5 is a functional diagram of master controller 144.

FIG. 5 is a functional diagram of master controller 144. The following is a more detailed description of the operations performed by the functional blocks described in FIG. 4.

Referring to pulse generator 308 in FIG. 5, the set input of pulse generator 308 is connected to the clock input of a pulse latch 310, a D-type latch, with the input of latch 310 connected to the supply voltage; the clear input of latch 310 is connected to the output of an AND gate 311; the noninverted output of latch 310 is connected to monostable multivibrator 312; and the inverted output of latch 310, which generates the RAMP ENABLE signal, is connected to one input of an AND gate 313, the input of a NOT gate 350, and the gate of a N-type, depletion mode transistor 307. The output of NOT gate 350 generates the SAMPLE signal with the input of NOT gate 350 connected one input of AND gate 313. The other input of AND gate 313 is connected to the RUN signal, thereby allowing the UVLO 300 to disable the pulse generator 308 before the supply voltage has reached the start-up threshold voltage, $V_{CCST}$. The reset input signal of the pulse generator 308, PLS RESET, is connected to the input of a NOT gate 321 which has its output connected to one input of AND gate 311. The other input of AND gate 311 is connected to the RUN signal, thereby allowing the UVLO 300 to disable the pulse generator 308. The output of delay 318 is connected to the clock input of latch 310; the input of latch 318 is connected to the inverted output of an out latch 317; and the timing voltage input of latch 318, which is the T2 signal, is connected to capacitor 218 which has its other end connected to SIGNAL GROUND.

Referring now to the connections of PWM 306, PWM 306 has the following inputs: FB, COMP, RAMP, and RAMPLIM. The output of PWM 306, which generates the PLS RESET signal, is connected to the input of a NOT gate 321. The RAMP input is connected to the drain of transistor 307, one end of resistor 190, and one end of capacitor 204. The source of transistor 307 is connected to SIGNAL GROUND and the gate of transistor 307, which has the input signal, RAMP ENABLE, is connected to the inverted output of latch 310 and one input of AND gate 313. The RLIM input to the PWM 306 is connected to the drain of a N-type, depletion mode MOSFET, transistor 305, one end of resistor 186, one end of capacitor 205, and one end of resistor 207. The source of transistor 305 is connected to SIGNAL GROUND and the gate of transistor 305 is connected to the output of a NOT gate 319. The input of NOT gate 319 is connected to the RUN signal.

The output generator 304 has its reset input, whose input is the inverted OUT RESET signal, connected to one input of an AND gate 320. The set input of output generator 304 is the clock input of latch 317, whereby latch 317 is a D-type latch with its input connected to the supply voltage; its clear input connected to the output of AND gate 320; its inverted output connected to the input of delay 318; and its non-inverted output connected to an output driver 322. The output signal of driver 322 is OUT2, and the driver 322 is enabled by the RUN signal. The other input of AND gate 320 is connected to the RUN signal and the output of AND gate 320 is connected to the clock input of latch 317. Out delay latch 316 has its output connected to the clock input of latch 317; its timing input, T1, is connected to one end of capacitor 220; and the input of delay 316, the OUT SET signal, is connected to the output of AND gate 313 and the input of the monostable multivibrator 314.

Referring to output timer 302, the ISNS input is connected to the non-inverting input of comparator 324; the inverting input of comparator 324 is connected to SIGNAL ground; and the output of comparator 324 is connected to the clock input of a latch 326. Latch 326 is a D-type latch with its input connected to the supply voltage; its clear input connected to the output of IPOS delay 328; and its inverted output connected to the gate of a N-type, depletion mode transistor 325. The ENABLE input of the output timer 302, consisting of the OUT2 signal, is connected to the input of a delay 328 which has its output connected to the clear input of latch 326. (A certain delay is desirable to allow the correct amount of negative current to be coupled back into the primary side.) The S&H input signal to the output timer 302 is connected to the input of a sample and hold circuit 330, one end of resistor 206 and one end of resistor 208. The output of the sample and hold circuit 330 is connected to the non-inverting input of a comparator 332. The SAMPLE & HOLD input, receiving the SAMPLE signal, is connected to the output of NOT gate 350. The non-inverting input of comparator 332 is connected to the output of the sample and hold circuit 330; the inverting input of comparator 332 is connected to the drain of transistor 325, one end of resistor 224, and one end of capacitor 222; and the output of comparator 332, which generates the inverted OUT RESET signal, is connected to one input of AND gate 320. The source of transistor 325 is connected to SIGNAL GROUND and the gate of transistor 325 is connected to the inverted output of latch 326.

Now turning to the operations of master controller 144, shown in FIG. 5 is pulse generator 308. The two outputs of pulse generator 308, PLS− and PLS+ are connected differentially to the pulse transformer primary winding 212 (See. FIGS. 3A/3B). When connected in this manner, the PLS− pulsed output is negative as compared to the PLS+ pulsed output. Both monostable multivibrator 312 and monostable multivibrator 314 generate a pulse from 20 ns to 40 ns in duration upon assertion of their input. Pulse latch 310 is a D-type latch with the input of latch 310 tied to the supply voltage. The clock input of pulse latch 310 is the output of PLS+ delay 318, and the clear input of pulse latch 310 is effectively connected to the PLS RESET signal. This arrangement allows the inverted output of pulse latch 310 to be asserted when PLS RESET is asserted, and the non-inverted output of pulse latch 310 to be asserted when both PLS RESET returns to low and a subsequent rising edge is applied to the clock input of pulse latch 310. Thus, NOT gate 321, AND gate 311, and pulse latch 310 function as latch 309 of FIG. 4. PLS+ delay 318 is a 100 ns to 5 μs delay line, the delay of which is externally selectable through capacitor 218. As shown in FIG. 5, the RUN signal is an input to AND gate 311 and AND gate 313 in order to disable pulse generator 308 before UVLO 300 asserts RUN high. The output of pulse latch 310 is connected to NOT gate 350, thereby asserting SAMPLE high when PLS+ is pulsed high and asserting SAMPLE low when PLS− is pulsed high.

Also shown in FIG. 5 is PWM 306. The RLIM input is negated before RUN is asserted by UVLO 300, thereby disabling the RAMP signal input. Once RUN is asserted by UVLO 300, PWM 306 is enabled and awaits assertion of RAMP ENABLE high. The RAMP input is negated by the RAMP ENABLE signal, thereby disabling PWM 306, until PLS+ is pulsed high by pulse generator 308. Once the PLS− is pulsed high, the RAMP ENABLE is asserted, and the RAMP input signal is governed by resistor 190 and capacitor 204.

The voltage source that is connected to the other end of resistor 190, by diode 192 or diode 188 (see FIGS. 3A/3B), governs the slope of the RAMP input signal. This arrangement provides feedforward voltage control as discussed further with the discussion of FIG. 6.

Another functional block shown in FIG. 5 is the output generator 304. OUT2 is negated when OUT RESET is negated. Out delay 316 consists of a 100–500 ns delay line, the time of which is externally selectable by capacitor 220. The output of delay 316 is connected to the clock input of out latch 317, a D-type latch with the input of latch 317 tied to the supply voltage of the master controller 144. The clear input of out latch 317, after power up, is effectively connected to OUT RESET. Thus, when OUT RESET is high, the inverted output of out latch 317, OUT2, is low. OUT2 remains low until OUT RESET is negated and a high input clock signal to latch 317 is subsequently asserted by the output of out delay 316.

As with the other functional blocks, an AND gate 320 is employed to disable operations before UVLO 300 asserts the RUN signal. The output of AND gate 320 is connected to the clear input of out delay 316, with its inputs being the RUN signal and the inverted OUT RESET signal. Thus, when either the RUN signal is negated or the OUT RESET signal is asserted, OUT2 is negated. The output driver 322, which is connected between the noninverted output of the out latch 317 and the output of master controller 144, drives the pulse transformer 146 (FIG. 3). Output driver 322 is disabled before the RUN signal is asserted, thereby prohibiting any false signals during power up or power down of the master controller 144.

The functional diagram of output timer 302 is also shown in FIG. 5. Before OUT2 is asserted, the clock input of latch 326 is low, thereby keeping the inverted output of latch 326 low and transistor 110 off. Thus, before OUT2 is asserted, the negative input of comparator 332 is held high, thereby ensuring that the output of comparator 332, the inverted OUT RESET signal, is held low. When OUT2 is asserted, a delay is introduced by delay 328 before the OUT2 signal resets latch 326. After this delay, the clock input to latch 326 is held high, awaiting the next input from the output of comparator 324. When the ISNS input becomes greater than zero, indicating that the secondary current, $I_S$, has become negative, the output of comparator 324 is asserted; therefore, the inverted output of latch 326 is negated. This starts a delay which allows energy from capacitor 118 to be transferred back to transformer 100. Because the output of comparator 332 is low, transistor 110 is turned off, and the inverting input signal to comparator 332 begins to ramp upwards until the inverting input of comparator 332 surpasses the output voltage of sample and hold circuit 330, $V_{SH}$. When this occurs, the output of comparator 332 is negated, thereby asserting OUT RESET high which negates OUT2.

Sample and hold circuit 330 samples during the on-time of transistor 110 when a proportion of $V_{IN}$ appears across secondary auxiliary winding 136, thereby providing feedforward voltage control to directly compensate for changes in $V_{IN}$. SAMPLE is held high during this time because of the connection of the SAMPLE input, through NOT gate 350, to the inverted output of the pulse latch 310. $V_D$ has a maximum value equal to the summation of $V_{IN}$ and a reflected $V_{OUT}$ voltage, $V_{OUT}$ multiplied by the turns ratio of transformer 100. The reflected $V_{OUT}$ voltage varies proportionally with $V_{IN}$; therefore, the maximum voltage of $V_D$ varies linearly with changes in $V_{IN}$. Thus, by sampling $V_{IN}$ through auxiliary winding 136, $V_{SH}$ varies linearly with $V_D$. If $V_{IN}$ increases, then more energy needs to be transferred back to discharge capacitor 114. Thus, the maximum value of $V_D$ increases, and $V_{SH}$ increases, thereby increasing the delay generated by output timer 302. Conversely, if $V_{IN}$ decreases, less energy needs to be transferred back to the input circuit 106 from the output circuit 108, and the delay generated by output timer 302 decreases.

Figure 6:
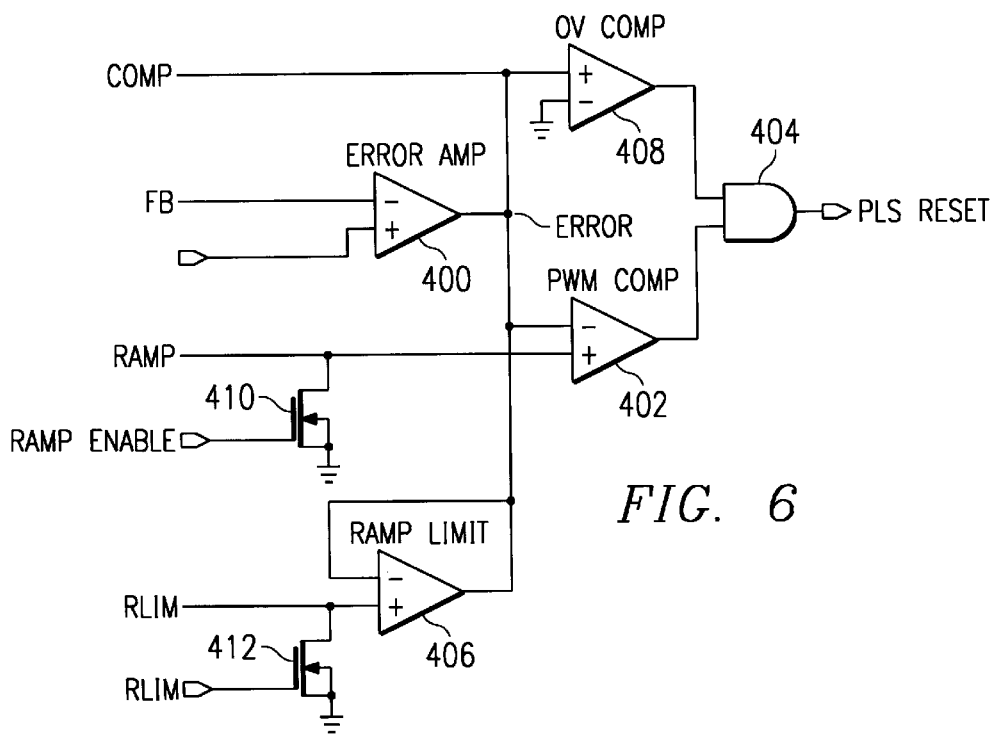
FIG. 6 is a functional diagram of pulse width modulation regulator 306.

FIG. 6 is a functional diagram of PWM 306. Referring now to FIG. 6, an error amplifier 400 has its inverting input connected to the FB input; the non-inverting input of error amplifier 400 is connected to the REF input; and the output of error amplifier 400 is connected to the non-inverting input of a comparator 408, the inverting input of a comparator 402, the output of a comparator 406, and the inverting input of comparator 406. An overvoltage comparator 408 has its inverting input connected to SIGNAL GROUND and its output connected to one input of an AND gate 404. A PWM comparator 402 has its non-inverting input connected to the drain of a N-type, depletion mode MOSFET, transistor 410 and its output connected to the other input of AND gate 404. The output of AND gate 404 provides the PLS RESET signal. The source of transistor 410 is connected to SIGNAL GROUND and the gate of transistor 410 is connected to the RAMP ENABLE input. The non-inverting input of amplifier 406 is connected to the RLIM input and the drain of a N-type, depletion mode MOSFET, transistor 412. The source of transistor 412 is connected to SIGNAL GROUND, and the gate of transistor 412 is connected to the RUN signal.

Turning now to the operations of PWM 306, the output of error amplifier 400 produces an error voltage, ERROR, which is the input signal to the inverting input terminal of PWM comparator 402. The non-inverting terminal of comparator 402 is connected to the RAMP input. Thus, when the RAMP input exceeds ERROR, PLS RESET goes high, thereby resetting pulse generator 308. Comparator 408 in combination with AND gate 404 ensures that should an overvoltage condition occur at the FB input, the operations of PWM 306 would be disabled. PWM 306 also permits access to the output of the error amplifier 400, through the COMP input pin, in order to allow external gain and frequency compensation for error amplifier 400.

Transistor 410 ensures that the RAMP signal will not be present at the non-inverting input terminal of comparator 402 until the appropriate time. As previously discussed, PWM 306 governs the on-time of transistor 110; therefore RAMP ENABLE is asserted during the on-time of transistor 110. This occurs after the PLS+ signal is asserted and before the PLS− signal is asserted. When RAMP ENABLE is asserted, transistor 410 is turned on and the RAMP input is disabled, thereby negating the PLS RESET signal. Thus, referring back to FIG. 5, the clear input to pulse latch 310 is pulled low, thereby enabling the output of pulse latch 310; however, the output of pulse latch 310 will remain low until the output of PLS+ delay 318 is once again asserted.

Amplifier 406 is configured as a unity gain buffer amplifier which establishes the maximum allowable value for ERROR, thereby effectively establishing the maximum value of the RAMP input. The RLIM signal is held to ground by transistor 412 until UVLO 300 asserts the RUN signal. The preferred embodiment incorporates a "soft start" feature for the PWM 306. Referring back to FIG. 3, the network formed by capacitor 205, resistor 186 and resistor 207 ensure that upon power up, the RLIM signal will be zero and thereafter slowly increase to its steady state value determined by resistor 186 and resistor 207. Thus, the amount of feedback voltage correction is limited during power up.

The delay generated by PWM 306 is subject to feedforward voltage control to compensate for changes in $V_{IN}$. This allows a more dynamic response by the master controller 144 to changes in $V_{IN}$ rather than relying on slower feedback voltage control. The delay generated by PWM 306 is governed by the time required for the RAMP input signal to go from zero volts to the ERROR signal. Thus, the delay generated by PWM 306 varies linearly with the slope of the RAMP signal. Referring back to FIG. 3, this slope is proportional to the voltage source connected to resistor 190 by either diode 188 or diode 192. As long as the voltage of auxiliary winding 136 is greater than REF, this auxiliary voltage, a sampled version of $V_{IN}$, will govern the slope of RAMP and the delay generated by output timer 302. Absent any feedback voltage control, for $V_{IN}$ between approximately 120 to 360 volts, $V_{OUT}$ varies linearly with $V_{IN}$; therefore, if $V_{IN}$ decreases, the slope of RAMP will decrease, thereby increasing the on-time of transistor 110 and keeping the output regulated for a given $V_{IN}$. Thus, ERROR does not change, and this feedforward mechanism directly compensates for changes in $V_{IN}$.

However, once $V_{IN}$ drops below a low threshold voltage, typically around 120 volts, $V_{OUT}$ changes sharply with small changes in $V_{IN}$. Thus, the feedforward control provided by auxiliary winding 136 is no longer sufficient, and the ERROR signal increases in an attempt to regulate $V_{OUT}$ assuming $V_{OUT}$ still varies linearly with $V_{IN}$. This results in transistor 110 remaining on for a long time; therefore, over-current conditions exist in the input circuit 106 because $I_p$ ramps upwards, out of control. To remedy this situation, diode 188 connects REF to resistor 188 when auxiliary winding 136 voltage drops below REF, thereby limiting the peak of $I_p$.

Figure 7:
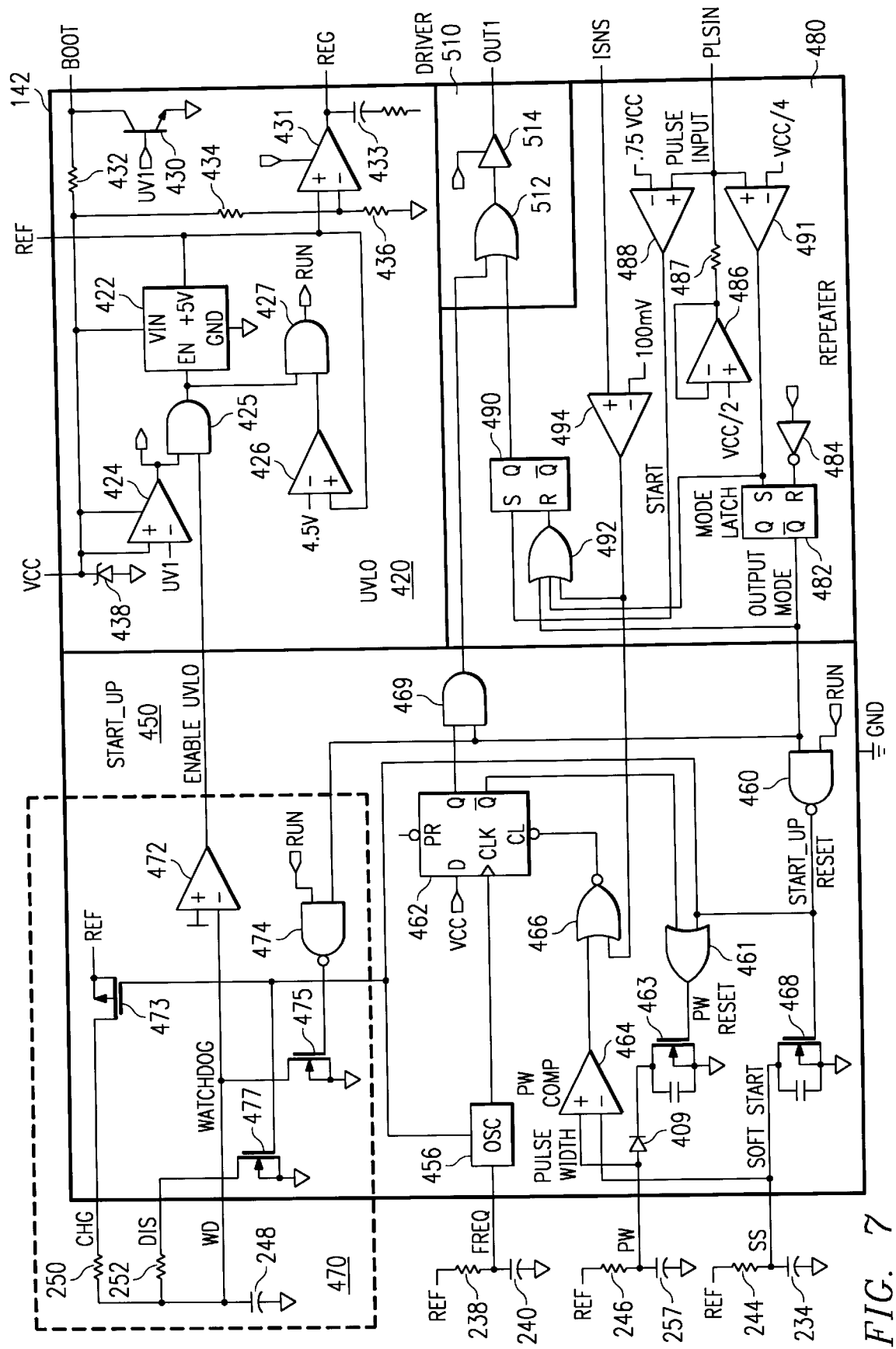
FIG. 7 is a functional diagram of slave controller 142.

FIG. 7 is a functional diagram of slave controller 142. The output signal of slave controller 142, OUT1, controls transistor 110. The slave controller 142 functions can be divided into four distinct sections: an undervoltage lockout section (UVLO) 420, a start-up section 450, a repeater section 480, and a driver section 510. UVLO 420 provides regulation, monitoring and protection for the slave controller 142 supply voltage; reset control for slave controller 142; and a regulated reference voltage, REF. The start-up section 450 provides complete and precise control of OUT1 by the slave controller 142 during the initial start up of the power supply. The repeater section 480 allows master controller 144, after power-up, to control OUT1 through the use of PLS+ and PLS−. The driver section 510 receives the waveforms from the start-up section 450 or repeater section 480 and generates a high-current, fast rise-time output, OUT1.

Referring to UVLO section 420 of the slave controller 142, a Zener diode 438 has its anode connected to the supply voltage and its cathode connected to primary side ground. A hysteresis comparator 424 has its non-inverting input connected to the supply voltage; its inverting input connected to its own hysteresis network which has a high-to-low threshold voltage of 8.25 volts and a low-to-high threshold of 12.5 volts; and the output of comparator 424, which generates the UV1 signal, is connected to one input of an AND gate 425. AND gate 425 has its other input connected to an ENABLE UVLO signal; and the output of AND gate 425 is connected to the ENABLE input of a reference regulator 422 and one input of an AND gate 427. As shown in FIG. 7, the reference regulator 422 has an ENABLE input and generates a 5 volt reference signal, REF. AND gate 427 has its other input connected to a hysteresis comparator 426 and the output of AND gate 427 generates the RUN signal. The non-inverting input of hysteresis comparator 426 is connected to REF, and the inverting input of hysteresis comparator 426 is connected to 4.5 volts. Referring now to the BOOT output, one end of a resistor 432 is connected to the voltage supply and the other end of resistor 432 is connected to the collector of a NPN BJT, transistor 430. The voltage at the collector transistor 430 is the BOOT signal. The base of transistor 430 is connected to the UV1 signal and the emitter of transistor 430 is connected to primary side ground. Referring now to the circuit which generates the REG signal, one end of a resistor 434 is connected to the supply voltage; and the other end of resistor 434 is connected to the inverting input of an amplifier 431 and one end of a resistor 436. The other end of resistor 436 is connected to primary side ground. The non-inverting input of amplifier 431 is connected to REF and the output of amplifier 431, which generates the REG signal, is connected to a frequency compensation network 433.

As shown in FIG. 7, UVLO 420 provides three external output signals: BOOT, REG, and REF. UVLO 420 also generates two internal signals used to prohibit full-scale operations of the slave controller 142 until power-up has been accomplished: UV1 and RUN.

Referring both to FIG. 3 and FIG. 7, BOOT is used to control the gate pin of an external, N-channel, depletion mode MOSFET, transistor 264, which allows bleed current from the unregulated input voltage, $V_{IN}$, to power up slave controller 142. Once power up is achieved, BOOT goes low, thereby turning off transistor 264. Transistor 264 is the external boot transistor which allows, during power up, the input voltage, $V_{IN}$, to supply current to slave controller 142 through bleed resistor 266 and bleed resistor 268. After power up, as will be discussed below, UVLO section 142 asserts BOOT low, thereby turning off transistor 264 and disconnecting bleed resistor 266 and bleed resistor 268 from the slave controller 142 voltage supply pin. After power-up, slave controller 142 is powered by auxiliary winding 278. Auxiliary winding 278 is connected to peak detector circuit 148. The output of peak detector 148 supplies DC voltage to slave controller 142.

REG is an external analog output signal generated by UVLO 420 which controls the gate pin of an external, N-type depletion mode MOSFET, which is used to regulate the supply voltage of slave controller 142. Transistor 260, connected between the output of the peak detector circuit 148 and the supply voltage, linearly regulates the supply voltage.

Now turning to the discussion of the operations of the UVLO 420 in FIG. 7, UVLO 420 prohibits full scale operations of slave controller 142 until slave controller 142 has been powered up. The supply voltage is the input signal of hysteresis comparator 424. The low-to-high threshold input voltage of comparator 424 is $V_{CCST}$, the start-up voltage, and the high-to-low input threshold voltage of comparator 424 is $V_{CCUV}$, the undervoltage limit of the supply voltage. When the supply voltage reaches $V_{CCST}$, the output of comparator 424 goes high, thereby asserting the UV1 signal high. When UV1 is asserted, a section of watchdog timer 370 is enabled, and the BOOT output is pulled low by transistor 430. Furthermore, because ENABLE UVLO is high during initial power up, as discussed below, REF regulator 422 is enabled.

Although once $V_{CCST}$ has been achieved the UV1 signal is asserted, the functions of slave controller 142 are still disabled until the RUN signal is asserted. The output of REF regulator 422 is connected to hysteresis comparator 426 which has a low-to-high input voltage of $V_{RTH}$. When REF reaches $V_{RTH}$, the RUN signal is asserted. The assertion of the RUN signal fully enables the operations of slave controller 142. The supply voltage, after power-up, is regulated by the REG output which linearly regulates the supply voltage through the use of current pass transistor 260.

Referring now to start-up section 450 of slave controller 142, an OUTPUT MODE signal generated by repeater section 480 is connected to one input of a NAND gate 460 and one input of a NAND gate 474. The other input of NAND gate 460 is connected to the RUN signal; and output of NAND gate 460, which generates a START-UP RESET signal, is connected to a reset input of an oscillator 456, the gate of a N-type, depletion mode MOSFET, transistor 468, and one input of an OR gate 461. Transistor 468 has its source connected to primary side ground; and the drain of transistor 468 is connected to the SS input of the slave controller 142 and the inverting input of a PW comparator 464. The other input of OR gate 461 is connected to the inverted output of a startup latch 462 and the output of OR gate 461 is connected to the gate of a N-type, depletion mode MOSFET, transistor 463. The source of transistor 463 is connected to primary side ground, and the drain of transistor 463 is connected to the anode of an element 467. Element 467, which can either be a diode or a voltage source, has its cathode connected to the PW input signal and the noninverting input of PW comparator 464. PW comparator 464 has its output connected to one input of a NOR gate 466. NOR gate 466 has its other input connected to an OVER-CURRENT RESET signal, which limits the current of input circuit 106, and its output connected to the clear input of a start-up latch 462. Start-up latch 462 is a D-type latch which has its input connected to the supply voltage; its clock input connected to the output of oscillator 456; its inverted output connected to one input of OR gate 461; and its noninverted output connected to one input of an AND gate 469. Sawtooth oscillator 456 has its voltage timing input connected to the FREQ input; its reset input connected to one input of OR gate 461, the gate of transistor 468, the output of NAND gate 460, and the gate of a P-type, depletion mode MOSFET, transistor 473. The output of AND gate 469, which generates a START-UP WAVEFORM signal, is connected to an OR gate 512.

Start-up section 450 generates the OUT1 signal necessary to power up master controller 144, START-UP WAVEFORM. In order for the output from this section to be enabled, OUTPUT MODE, a signal generated by repeater 480, must be high. Once master controller 144 has been powered up, master controller 144 negates the OUTPUT MODE signal which will be further discussed below. Start-up section 450 has three externally selectable features: the maximum duty cycle of START-UP WAVEFORM; the time required for START-UP WAVEFORM to reach its maximum duty cycle, thereby achieving a "soft start" power up; and the frequency of the START-UP WAVEFORM signal. The maximum duty cycle of START-UP WAVEFORM is governed by the PW input. The "soft start" time of the START-UP WAVEFORM is governed by the SS input. The frequency of the START-UP WAVEFORM is governed by the FREQ input.

In order to understand the operations of start-up section 450, it is helpful to analyze the initial conditions of start-up section 450 before RUN is asserted. Referring to FIG. 7, when RUN is low, START-UP RESET, the signal generated by the output of NAND gate 360, is high. Thus, transistor 468 is turned on and SS is negated. Similarly, transistor 463 is turned on, thereby discharging capacitor 257 until PW is equal to $V_{PWL}$, the voltage drop across element 467. Element 467 may either be a diode or a voltage source. Oscillator 456, a sawtooth oscillator, is also disabled before RUN is asserted. The output of oscillator 456 is connected to the clock input of start-up latch 462, a D-type latch.

When RUN is asserted, oscillator 456 is enabled; therefore, oscillator 456 supplies the clock signal for start-up latch 462. When the RUN signal is first asserted, PW is equal to $V_{PWL}$, and SS is low. The output of comparator 464, which is connected to NOR gate 466, is initially high. The output of NOR gate is connected to the clear input of latch 462. Thus, when the RUN signal is first asserted, the non-inverted output of latch 462 negates the START-UP WAVEFORM signal.

The START-UP WAVEFORM signal remains low until SS reaches $V_{PWL}$. During the time period in which START-UP WAVEFORM is low, PW never exceeds $V_{PWL}$. The noninverted output of latch 462 ensures that transistor 463 will remain on, thereby keeping PW equal to $V_{PWL}$. Thus, in order for comparator 464 to change to its low state, SS must reach $V_{PWL}$. Once this occurs, latch 462 is then enabled, and on the next falling edge of the oscillator 456 output, the non-inverted output of latch 462 will be asserted. Once SS reaches $V_{PWL}$, start-up section 450 begins to function and generates the START-UP WAVEFORM with a duty cycle that gradually increases over time.

The duty cycle of START-UP WAVEFORM gradually increases over time. Latch 462, because its input is the supply voltage, asserts START-UP WAVEFORM high every falling edge of the clock signal generated by oscillator 456. The on-time of START-UP WAVEFORM is equal to the time for PW to ramp upward from $V_{PWL}$ to SS. Until SS equals REF, SS increases over time. Thus, until SS equals REF, the time for PW to ramp from $V_{PWL}$ to SS also increases over time. Once PW equals SS, a high output from comparator 464 clears latch 462, thereby negating START-UP WAVEFORM. Once the output of NOR gate 466 is asserted, capacitor 257 is immediately discharged through transistor 463 until PW equals $V_{PWL}$. START-UP WAVEFORM remains low until the next falling edge of the clock signal produced by oscillator 456. Thus, as SS increases, the time during which START-UP WAVEFORM remains low decreases; therefore, the duty cycle of START-UP WAVEFORM increases with time. Eventually, SS reaches its steady state value, REF. When this occurs, START-UP WAVEFORM reaches its maximum duty cycle which thereafter remains constant.

Referring now to the watchdog section 470 of the start-up section 450, the OUTPUT MODE input signal is connected to an input of NAND gate 474. NAND gate 474 has its other input connected to the UVLO 420 signal, UV1, and its output connected to the gate of a N-type, depletion mode MOSFET, transistor 475. Transistor 475 has its source connected to ground; and its drain connected to the inverting input of a hysteresis comparator 472, one end of capacitor 248, one end of resistor 252 and one end of resistor 250. The drain of transistor 475 is connected to the WD input signal. The gate of a N-type, depletion mode MOSFET, transistor 477, is connected to the START-UP RESET signal; the source of transistor 477 is connected to primary side ground; and the drain of transistor 477, which generates a DIS signal, is connected to one end of resistor 252. The source of transistor 473 is connected to REF; the gate of transistor 473 is connected to the START-UP RESET signal; and the drain of transistor 473 is connected to one end of resistor 250. The drain of transistor 473 provides the CHG signal. The output of comparator 472 provides the ENABLE UVLO signal.

Watchdog section 470 of start-up section 450 controls the timing of the start-up attempts by interfacing with UVLO 420 through the ENABLE UVLO signal to pull RUN low after an externally selectable watchdog timeout period. This allows slave controller 142 a set time period in which to power up master controller 144. If unsuccessful, watchdog section 470 pulls RUN low and resets the start-up section 450. Referring back to FIG. 3, the watchdog timeout period is externally selectable by resistor 250 and capacitor 248. The watchdog reset period is externally selectable by resistor 252 and capacitor 248.

The watchdog timeout period is the time during which WD, the voltage of capacitor 248, goes from zero to $V_{WDTH}$, the watchdog threshold voltage and the high-to-low threshold input voltage of hysteresis comparator 472. Once the comparator 472, connected to AND gate 425, negates its output signal, ENABLE UVLO, RUN, the output signal of AND gate 427, is negated. When RUN is negated, NAND gate 360 asserts a high START-UP RESET, thereby resetting the start-up section 450. When START-UP RESET goes high, transistor 477 is turned on, thereby initiating the discharge of capacitor 248. Watchdog section 470 will hold the start-up section 450 in its reset state until WD reaches $V_{WDRST}$, a watchdog reset voltage and the low-to-high input threshold voltage of comparator 472. Once this occurs, the output of comparator 472 asserts ENABLE UVLO high, and RUN is asserted by AND gate 427, thereby bringing the start-up section 450 out of reset. START-UP RESET then is negated, thereby turning on transistor 473, which allows capacitor 248 once again to charge and WD to rise to $V_{WDTH}$.

Referring to the repeater section 480, the PLSIN input of the slave controller 142 is connected to one end of a resistor 487, the non-inverting input of a comparator 488, and the inverting input of a comparator 490. Comparator 488 has its inverting input connected to $0.75 \times V_{CC}$ and its output, which generates the START signal, is connected to the SET input of a latch 482. A comparator 491 has its non-inverting input connected to $V_{CC}/4$, and its output, which generates a END signal is connected to one input of an OR gate 492 and the SET input of a mode latch 482. An amplifier 486 has its non-inverting input connected to $V_{CC}/2$; and its inverting input connected to the output of amplifier 486 and the other end of resistor 487. Mode latch 482 is a set-reset latch which has its set input connected to the output of a comparator 490; its reset input connected to the output of a NOT gate 484; and its inverted output, which generates the OUTPUT MODE signal, is connected to one input of NAND gate 460 and one input an OR gate 492. The ISNS input of the slave controller 142 is connected to the non-inverting input of a comparator 494. Comparator 494 has its inverting input connected to 100 mV and its output, which generates the OVER-CURRENT RESET signal, is connected to one input of NOR gate 466. OR gate 492 has three inputs, one being connected to the inverted output of latch 482; one input is connected to the output of comparator 491; and one input is connected to the output of comparator 494. The output of OR gate 492 is connected to the RESET input of repeater latch 490. The non-inverted output of latch 490, which generates the REPEATER WAVEFORM signal, is connected to the input of OR gate 512.

Repeater section 480 determines the signal that will generate the OUT1 signal, either START-UP WAVEFORM or REPEATER WAVEFORM. Upon power up of the master controller 144, OUT1 is the signal START-UP WAVEFORM, which is generated by start-up section 450. Once slave controller 142 has succeeded in powering-up master controller 144, the repeater section 480 disables the start-up section 450 and allows the master controller 144 to generate the REPEATER WAVEFORM signal which appears as the OUT1 signal.

Referring to FIG. 7, PLSIN, the input from the master controller 144 through pulse transformer 146, has a DC voltage of $V_{CC}/2$. This DC voltage bias is obtained by configuring amplifier 486 as a voltage buffer. One-half of $V_{CC}$ is applied to the noninverting input of amplifier 486; therefore, $V_{CC}/2$ appears at the output of amplifier 486. The only current that exists in resistor 487 is the negligible input currents of comparator 488 and comparator 491. Thus, PLSIN has a DC bias voltage of $V_{CC}/2$.

After master controller 144 is powered up, the master controller 144 generates REPEATER WAVEFORM by sending pulses, PLS+ and PLS−, to slave controller 142. At the PLSIN input, the pulses from master controller 144 are centered at $V_{CC}/2$. Comparator 488 has an input threshold voltage of $3 \times V_{CC}/4$ with its noninverting input connected to PLSIN. Thus, when the master controller 144 pulses PLS+ high, the output of comparator 488 will assert a START signal high. Likewise, comparator 386 has an input threshold voltage of $V_{CC}/4$ with its inverting input connected to the PLSIN input. Thus, if master controller 144 pulses PLS− high, the output of comparator 386 will assert a END signal high. If neither PLS+ or PLS− are pulsed high, then both the START and END signals are low.

The mode latch 482 determines the waveform that will be present at OUT1, either START-UP WAVEFORM or REPEATER WAVEFORM. Mode latch 482 is a set-reset latch. Before slave controller 142 is powered up, RUN is low; therefore, the output of NOT gate 484 resets the output of mode latch 482. Upon power up, the set input of mode latch 482 is low because master controller 144 has not been powered up, and thus, there is no input at PLSIN. The resetting of mode latch 482 asserts OUTPUT MODE high, thereby enabling the start-up section 450. When OUTPUT MODE is high, the repeater latch 490 is reset, thereby enabling the START-UP WAVEFORM signal to appear at the output of the slave controller 142. The set input of the repeater latch 390 is low because no pulses are present at PLSIN during start-up of the master controller 144.

Master controller 144 must communicate its powered-up status to slave controller 142 in order that master controller 144 can begin controlling the output of the slave controller 144. Master controller 144 does this by pulsing PLS− high. When this occurs, comparator 491 asserts END, thereby asserting the noninverted output of mode latch 482. OUTPUT MODE goes low, thereby disabling start-up section 450. Once this has occurred, slave controller 142 is ready to receive commands from master controller 144. When master controller 144 pulses PLS+ high, START is asserted, thereby setting repeater latch 390 and asserting REPEATER WAVEFORM high. REPEATER WAVEFORM remains high until master controller 144 pulses PLS− high, whereby END is asserted by comparator 491 and the noninverted output of repeater latch 390 is reset, thereby negating REPEATER WAVEFORM.

Repeater section 480 also contains a circuit to negate OUT1 whenever the primary current, $I_p$, exceeds the maximum current desired in the input circuit. This feature is intended to provide instantaneous, high speed over-current protection. Referring to FIG. 7, this circuit consists of the ISNS input connected to comparator 494. The output of comparator 494 is connected to OR gate 492. A threshold voltage of 100 mV is connected to the inverting input of the comparator 494. When ISNS exceeds 100 mV, comparator 494 asserts OVER-CURRENT RESET, the voltage at its output, thereby negating the output of latch 490 and OUT1. The ISNS input in the present embodiment is the voltage across resistor 243, which is used to sample the primary current, $I_p$. (See FIG. 3).

Driver 510 consists of an OR gate 512 which has two inputs, START-UP WAVEFORM and REPEATER WAVEFORM. The mode latch 482 ensures that both inputs cannot be simultaneously active. The output of OR gate 512 is connected to the input of a driver 514 which generates a high current, fast rise-time output. Driver 514 is disabled when RUN is low, thereby prohibiting any false output signals during the power-up or power-down of slave controller 142.

Figure 8:
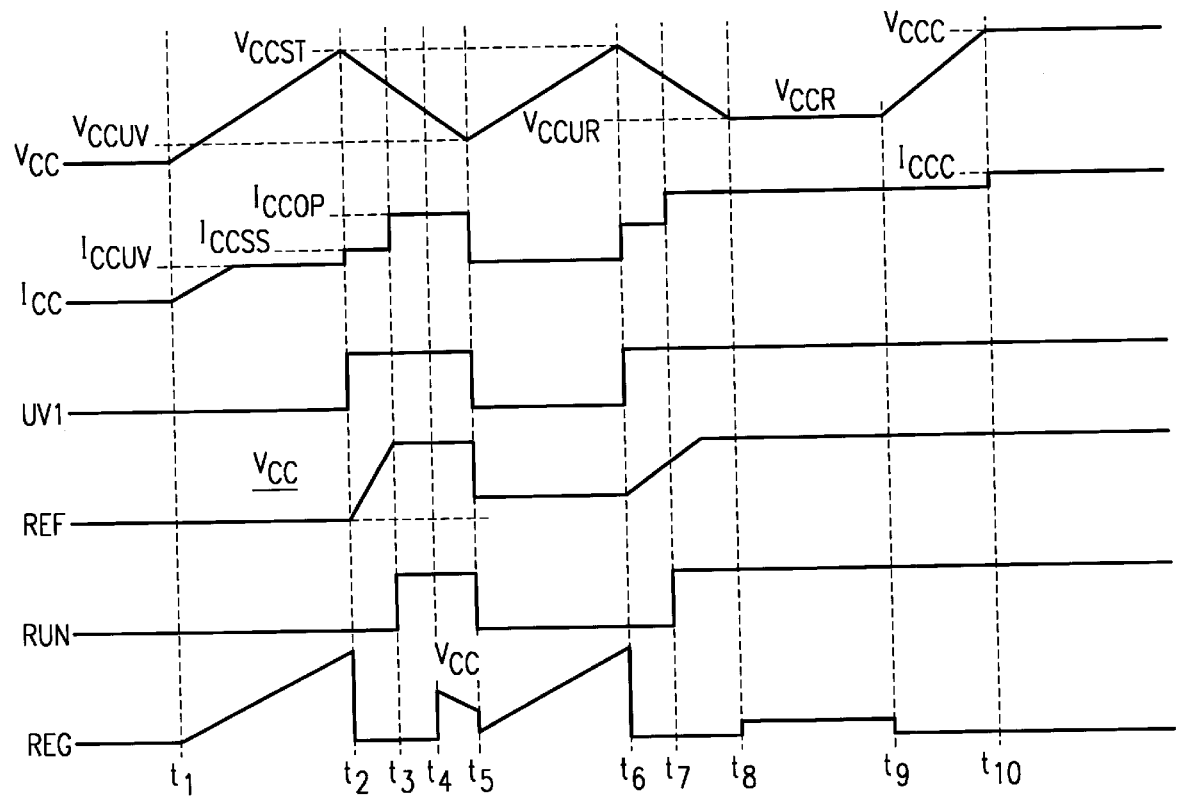
FIG. 8 illustrates the operations of the master controller undervoltage lockout function (UVLO 300).

FIG. 8 illustrates the waveforms present during the power up of master controller 144 and the regulation of the supply voltage after power up. As noted from FIG. 8, the undervoltage threshold is $V_{CCUV}$ and the upper voltage threshold is $V_{CCST}$. As shown in FIG. 8, at time t1, $V_{CC}$, the supply voltage is initially at zero volts; therefore, REG linearly increases with time in an effort to regulate the supply voltage. Thus, from time t1 until time t2, $V_{CC}$ linearly increases with time. At time t2, $V_{CC}$ reaches the startup voltage threshold, $V_{CCST}$. $I_{CC}$, the supply current, initially zero, rises with time until it reaches $I_{CCUV}$ which is the undervoltage operating current to the master controller 144 during bootup. Also during time t1 until time t2 UV1 is low, thereby negating REF. Also, RUN is low, thereby disabling the functions of master controller 144.

At time t2, $V_{CC}$ reaches the startup voltage, $V_{CCST}$, and REG is negated. At this time, UV1 is asserted and the reference regulator 425 begins to function. $I_{CC}$, beginning at time t2, is at $I_{CCSB}$, the $I_{CCSB}$ standby current. Also note that during time t2 until time t3, REF increases with time, whereby reference regulator 425 has been enabled by UV1.

At time t3, REF has reached its operating voltage. Thus, RUN is asserted. Furthermore, the supply current, $I_{CC}$, is now at its operating level, $I_{CCOP}$. Because RUN is asserted, master controller 144 is now fully functional. Note that during time t3 until time t4, REG is low because the supply voltage, $V_{CC}$, has not reached its undervoltage threshold, $V_{CCUR}$.

At time t4, the supply voltage, $V_{CC}$, has reached the undervoltage threshold, $V_{CCUV}$. Thus, REG is no longer negated. The REG signal is a positive voltage used to control the current through transistor 166 (see FIG. 3). Note that during time t2 to time t5, a fault in external circuitry prevents REG from sustaining $V_{CC}$ above $V_{CCUV}$.

At time t5, $V_{CC}$ drops to the undervoltage threshold limit, $V_{CCUV}$ and reinitiates bootup. Thus, UV1 is negated, REF is negated, and the RUN signal is negated. Thus, the events which occurred from time t1 until T5 are once again repeated during time t5 to time t8.

At time t8, REG is once again asserted as $V_{CC}$ drops to its undervoltage threshold, $V_{CCUR}$. However, unlike at time t4, no fault exists in external circuitry, thereby allowing REG to regulate $V_{CC}$. From time t8 to time t9, the signal REG controls transistor 166 which in turn regulates $V_{CC}$. $V_{CC}$ is held at the regulation voltage, $V_{CCR}$, during the time from T8 until time t9. Thus, at time t8, power up of the master controller 144 has occurred.

At time t9, a fault in external circuitry causes overvoltage on $V_{CC}$. During the time from time t9 until time t10, $V_{CC}$ increases until it reaches the $V_{CC}$ maximum voltage, $V_{CCC}$. At time t10, $V_{CC}$ is clamped to $V_{CCC}$. Note that at this maximum operating supply voltage, the supply current, Icc, is limited to $I_{ccc}$, the maximum supply current.

Figure 9:
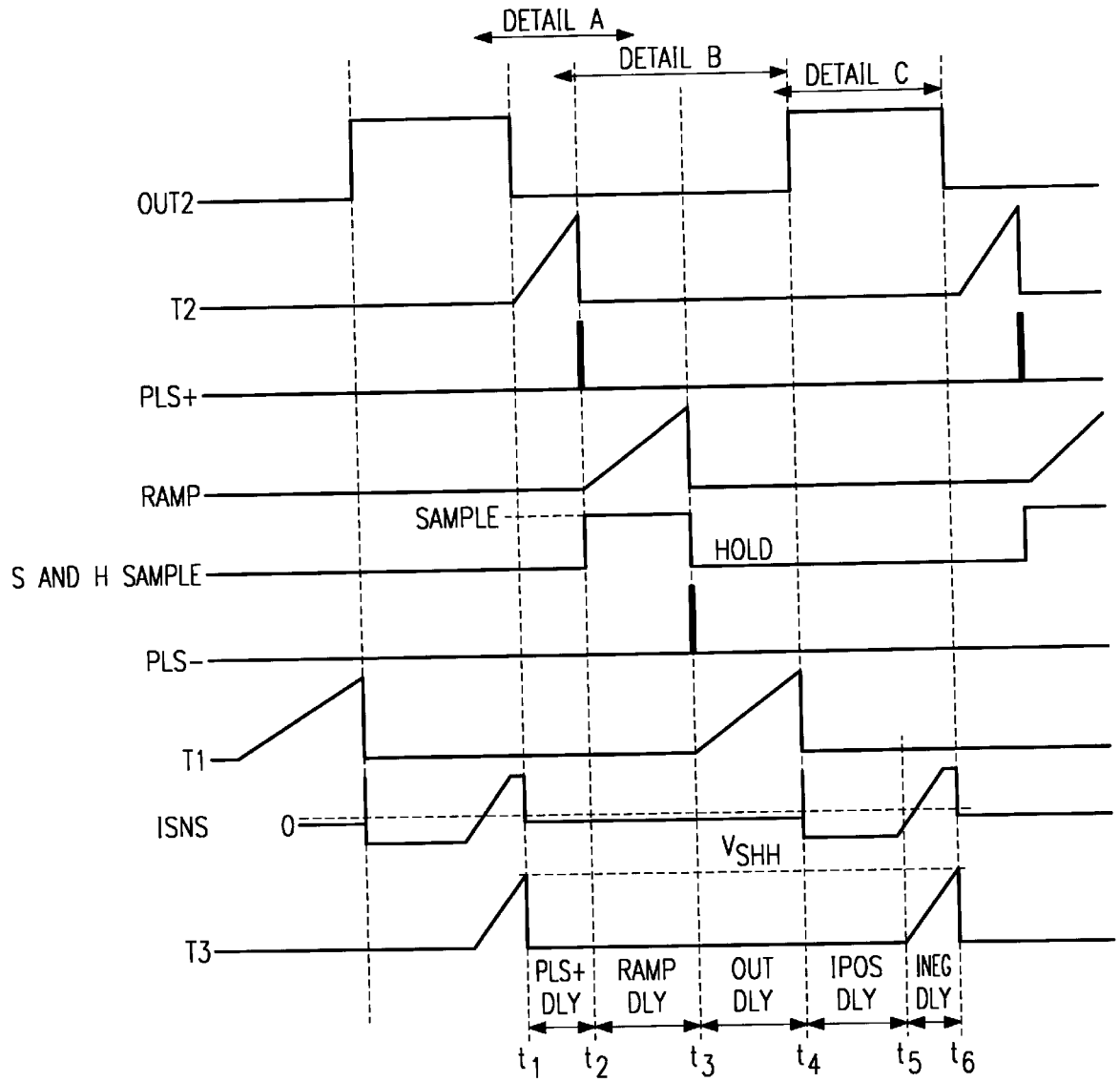
FIG. 9 illustrates the waveforms and delays generated by master controller 144.

FIG. 9 illustrates the OUT2, PLS−, and PLS+ signals generated by master controller 144. These are the signals present once master controller 144 has powered up, and the power supply is operating in steady state. Note that OUT2 is tied to the gate of transistor 116, thereby controlling the on and off switching of transistor 116. Master controller 144 pulses PLS+ high in order to communicate to slave controller 142 to turn on transistor 110. Master controller 144 pulses PLS− high to communicate to slave controller 142 to turn off transistor 110. Therefore, in FIG. 9, the time from time t4 until time t8, is the on-time transistor 116, and the time from T2 until time t3 is the on-time of transistor 110.

At time t1, the output generator 304 has been reset by output timer 302, thereby asserting OUT2 low. There are several delays which comprise the off-time of OUT1. The first of these delays is generated by PLS+ delay 318. As shown in FIG. 9, during the time from time t1 to time t2, the input signal T2 ramps from zero to a predefined level. When at time t2 the signal T2 ramp voltage has reached its trigger level, the high OUT RESET signal then passes through delay 318 to the SET input of pulse generator 308. Thus, PLS+ delay 318 introduces the delay from time t1 to time t2.

After this delay, latch 309 is set, thereby pulsing high PLS+. This occurs at time t2. Thus, at time t2 transistor 110 is turned on by slave controller 142. Also at time t2, SAMPLE is asserted, thereby enabling sample and hold circuit 330. Thus, the voltage of secondary auxiliary winding 136 is sampled from time t2 to time t3. During this period, the voltage present at auxiliary winding 136 is a sample of the input voltage, whereby transistor 110 is on, thereby allowing the input voltage, $V_{IN}$, to exist across inductor 102. Also at time t2, the voltage of capacitor 144 is discharged. Furthermore, at time t2, PWM 306 is enabled, thereby introducing a delay from time t2 to time t3. This is the delay between the turning on of transistor 110 by the pulsed PLS+ signal and the turning off of transistor 110 through the pulsed PLS− signal when PWM 306 asserts the PLS RESET signal high. The delay introduced during time t2 to time t3 controls the on-time of transistor 110. This delay is subject to the feedback control network 160, thereby allowing feedback voltage control from the output control for the on-time of transistor 110 and the associated off-time of transistor 116.

At time t3, PWM 306 asserts PLS RESET high, thereby resetting pulse generator 308. Thus, at time t3, the PLS− signal is pulsed high, thereby communicating to slave controller 142 to turn off transistor 110. The final delay of the off-time of transistor 116 is set by out delay 316. Signal T1, the voltage across capacitor 220 (see FIG. 5), then rises above zero, thereby enabling out delay 316 when signal T1 reaches a predefined level. Capacitor 220 is thereby discharged, and the output of out delay 316 sets output generator 304 at time t4, thereby turning on transistor 116 by asserting OUT2 high.

Referring to FIG. 5 and FIG. 9, capacitor 218 is chosen so the delay introduced by PLS+ delay 318, during time t1 until time t2, will allow capacitor 114, the parasitic drain-source capacitance of transistor 110, to discharge. This delay is preferably one-fourth of the LC time constant on the primary side, which is determined by the total primary inductance in combination with the capacitance seen across the terminals of the primary transistor 110 in the off state.

The delay from time t3 until time t4 allows parasitic capacitor 122 to "ring down" after the switching off of transistor 110 and before the switching on of transistor 116. Both delay 316 and PLS+ delay 318 generate delay periods set by external capacitors, capacitor 220 and capacitor 218, respectively.

Referring again to FIG. 5 and FIG. 9, from time t4 until time t8 is the on-time of transistor 116. This time period consists of two delays: IPOS DLY and INEG DLY. IPLS DLY is a small fixed delay added to the start of the sequence to allow time for the ISNS input to stabilize below zero volts. As can be seen from FIG. 5, IPOS latch 326 is disabled during the fixed delay introduced by IPOS delay 328. IPOS delay 328 introduces a maximum delay of 80 ns. This delay is the minimum on-time of OUT2. The INEG DLY from time t5 until time t6 is the delay introduced to allow enough energy to be transferred from the output circuit 108 of back into the input circuit 106 to allow capacitor 114 to discharge when transistor 110 is thereafter turned on. At time t5, the secondary current, $I_S$, has gone negative, thereby transferring energy back into transformer 100. As shown in FIG. 9, the INEG DLY is the time it takes signal T3, the voltage of capacitor 222, to go from zero volts to the voltage sampled by sample and hold circuit 330, $V_{SH}$. (Note that capacitor 222 is fed by a constant current, and has a trip voltage much smaller than Vout, so a linear relationship is achieved.) At time t8, signal T3 reaches the sample and hold voltage, $V_{SH}$, and the OUT RESET signal is asserted, thereby negated OUT2.

Figure 10:
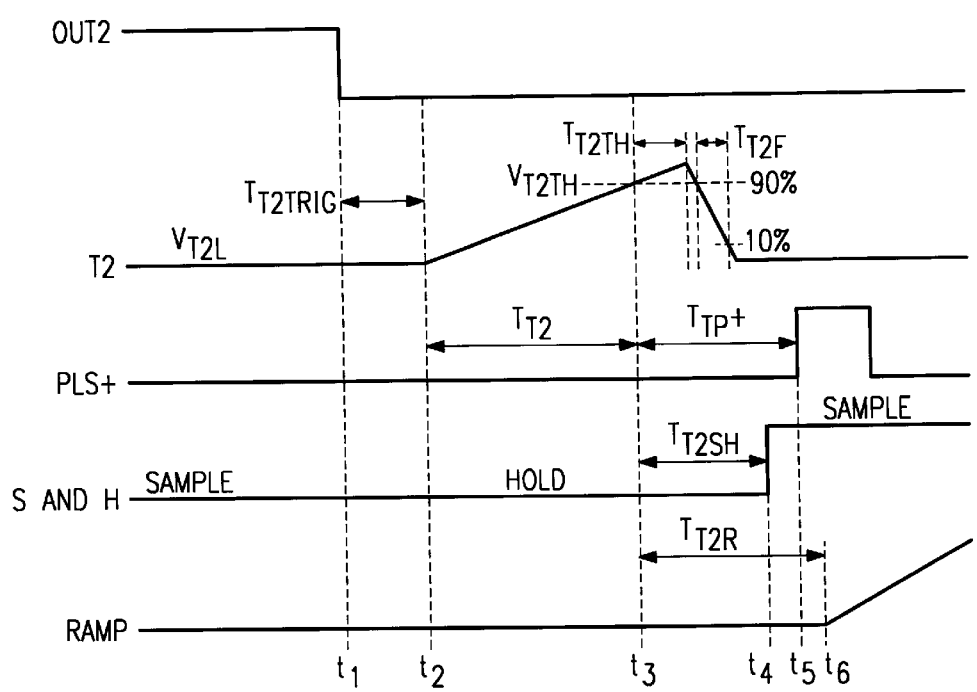
FIG. 10 is an illustration of detail A of FIG. 9.

FIG. 10 illustrates detail A of FIG. 9, thereby showing the time between the transition of OUT2 from high to low and the charging of capacitor 218. Referring to FIG. 9 and FIG. 10, at time t1, OUT2 goes from high to low. After a delay $T_{T2TRIG}$, which represents the propagation input delay of delay 318, signal T2 begins to ramp upward at time t2. At time t3, signal T2 reaches its upper threshold voltage, $V_{T2TH}$, which is 90 percent of the peak voltage of signal T2. The PLS+ signal is then pulsed high after a propagation delay of $T_{TP+}$ from time t3, the time at which signal T2 reaches its threshold voltage, $V_{T2TH}$. $T_{T2TH}$ represents the threshold discharge time delay, the time which it takes signal T2 to go from $V_{T2H}$ back to $V_{T2TH}$ again. $T_{T2F}$ is the fall time of signal T2. This represents the time it takes signal T2 to go from 90 percent of its peak voltage to ten percent of its peak voltage. $T_{T2SH}$ represents the propagation delay between signal T2 reaching $V_{T2TH}$ and the assertion of SAMPLE high, thereby enabling sample and hold circuit 330. $T_{T2R}$ represents the propagation delay between signal T2 reaching its threshold voltage, $V_{T2TH}$, and the enabling of the RAMP input signal of PWM 306.

Figure 11:
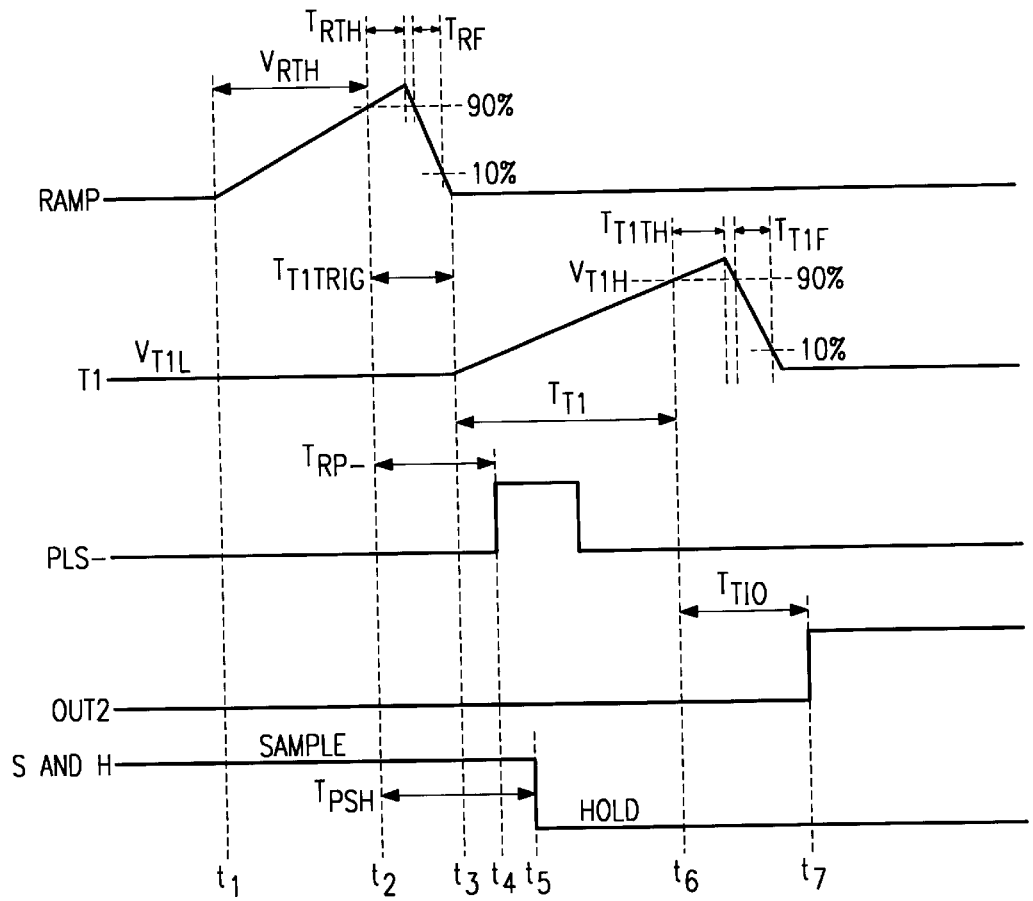
FIG. 11 is an illustration of detail B of FIG. 9.

FIG. 11 illustrates detail B of FIG. 9, thereby showing the delays present from time t2 until time t5 of FIG. 9. The RAMP input signal, at time t1 begins to ramp up until it reaches its threshold value, $V_{RTH}$, which is equal to the ERROR signal. $T_{RTH}$ represents the time it takes the RAMP input signal to go from $V_{RTH}$ to its peak voltage. $T_{RF}$ represents the fall time of the RAMP input signal. Turning now to signal T1, $T_{T1TRIG}$ is the propagation delay between RAMP reaching its threshold voltage, $V_{RTH}$, and the charging of capacitor 220. Thus, at time t3, signal T1 ramps upward until it reaches its threshold voltage $V_{T1H}$, at time t6. $T_{T1TH}$ is the time for signal T1 to go from its threshold value, $V_{T1H}$ to its maximum peak voltage. $T_{T1F}$ is the fall time of signal T1. Turning now to the PLS– signal, $T_{RP-}$ is the propagation delay from when RAMP reaches its threshold voltage, $V_{RTH}$, to when the PLS-signal is pulsed high at time t4. Turning now to OUT2, OUT2 is asserted after a propagation delay $T_{TIO}$, which represents the delay from the time signal T1 reaches $V_{T1H}$ at time t6 to when OUT2 is asserted at time t7. Turning now to sample and hold circuit 330 input S&H, $T_{PSH}$ represents the propagation delay between the time RAMP reaches its threshold voltage, $V_{RTH}$, at time t2, to when the SAMPLE input and the S&H input are negated at time t5, thereby initializing a hold of the voltage sampled by sample and hold circuit 330.

Figure 12:
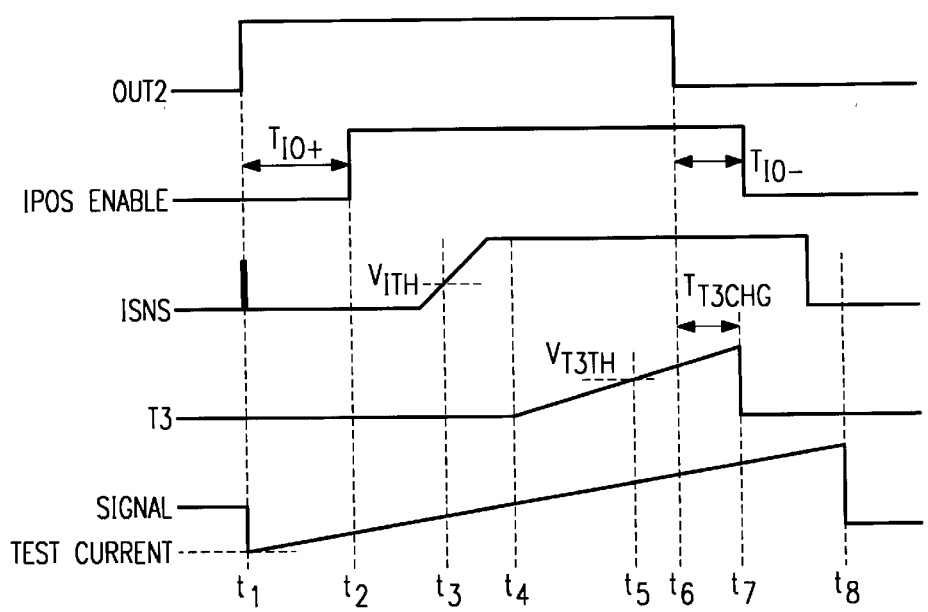
FIG. 12 is an illustration of detail C of FIG. 9.

FIG. 12 is Detail C of FIG. 9 which illustrates the delays generated during the on-time of transistor 116. As shown in FIG. 5, a test signal, SIGNAL, and the OUT2 signal are connected to a test network 360 to test the delay introduced by the ISNS input. In test network 360, the drain of a transistor 323 is connected to a SIGNAL; the gate of transistor 323 is connected to OUT2; and the source of transistor 323 is connected to the ISNS input, the cathode of a diode 331 and the cathode of a diode 329. The anode of diode 331 is connected to SIGNAL. The anode of diode 329 is connected to ground. The drain of a transistor 325 is connected to SIGNAL, the source of transistor 325 is connected to ground; and the gate of transistor 325 is connected to OUT2. The anode of a diode 327 is connected to SIGNAL and the cathode of diode 327 is connected to ground.

Diode 331 and diode 327 clamp the voltage swing of transistor 323 and transistor 325, respectfully. Both transistor 325 and transistor 323 are turned off when OUT2 is low. SIGNAL is a test current. When OUT2 is asserted, transistor 323 and transistor 325 turn on, thereby allowing the test current SIGNAL to generate a ramping voltage across the resistance provided by diode 329.

Referring to FIGS. 5 and 12, At time t1, OUT2 is asserted; however, IPOS ENABLE, the clear input of IPOS latch 326, is not asserted until a propagation delay of $T_{IO+}$ which represents the internal delay introduced by IPOS delay 328. Delay 328 ensures that comparator 324 is stabilized before the ISNS signal is sampled. Shown in FIG. 12 is the SIGNAL test current which is tantamount to $-I_S$ (see FIG. 1). Referring to FIG. 12, when ISNS reaches its threshold voltage $V_{ITH}$, signal T3 begins to ramp upwards after a propagation delay $T_{T3CHG}$. Signal T3 ramps upward from time t4 until time t5 when signal T3 reaches the threshold voltage $V_{T3TH}$, which represents the voltage sampled by sample and hold circuit 330, $V_{SH}$. Time t5 to time t6 represents the propagation delay from the time signal T3 reaches its threshold voltage, $V_{T3TH}$ at time t5, to when signal T3 goes low at T6. Note that IPOS ENABLE does not go low until propagation delay $T_{IO-}$, which represents the delay introduced by IPOS delay 328. Capacitor 223 is discharged after propagation delay $T_{T3DIS}$ which occurs after OUT2 is negated. The signal current of test circuit 360 remains turned on until time t8; however, in the present embodiment, the secondary current, $I_S$, would drop to zero after the transition of OUT2 from high to low at time t6.

Figure 13:
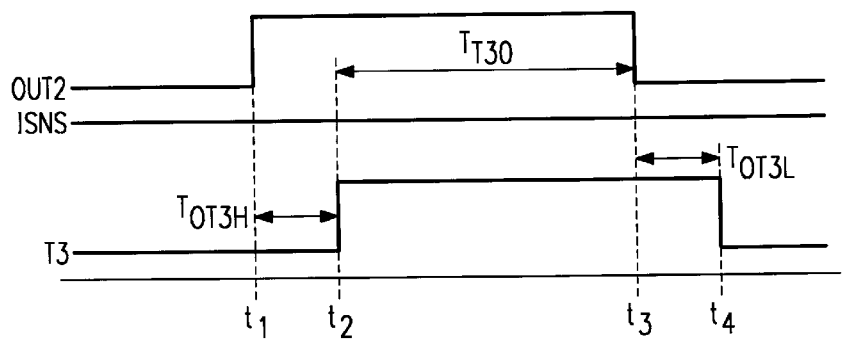
FIG. 13 shows the output signal of the master controller 144, OUT2, with the ISNS input and T3 input held high.

FIG. 13 is another test configuration with ISNS held high and capacitor 222 removed, thereby pulling signal T3 high after a propagation delay. As seen from FIG. 13, at time t1, OUT2 is asserted; however, signal T3 is not asserted until after propagation delay $T_{OT3H}$, the delay introduced by IPOS delay 328 and other propagation delays. Similarly, at time t3, OUT2 is negated and $T_{OT3L}$ represents the propagation delays before signal T3 is negated.

Figure 14:
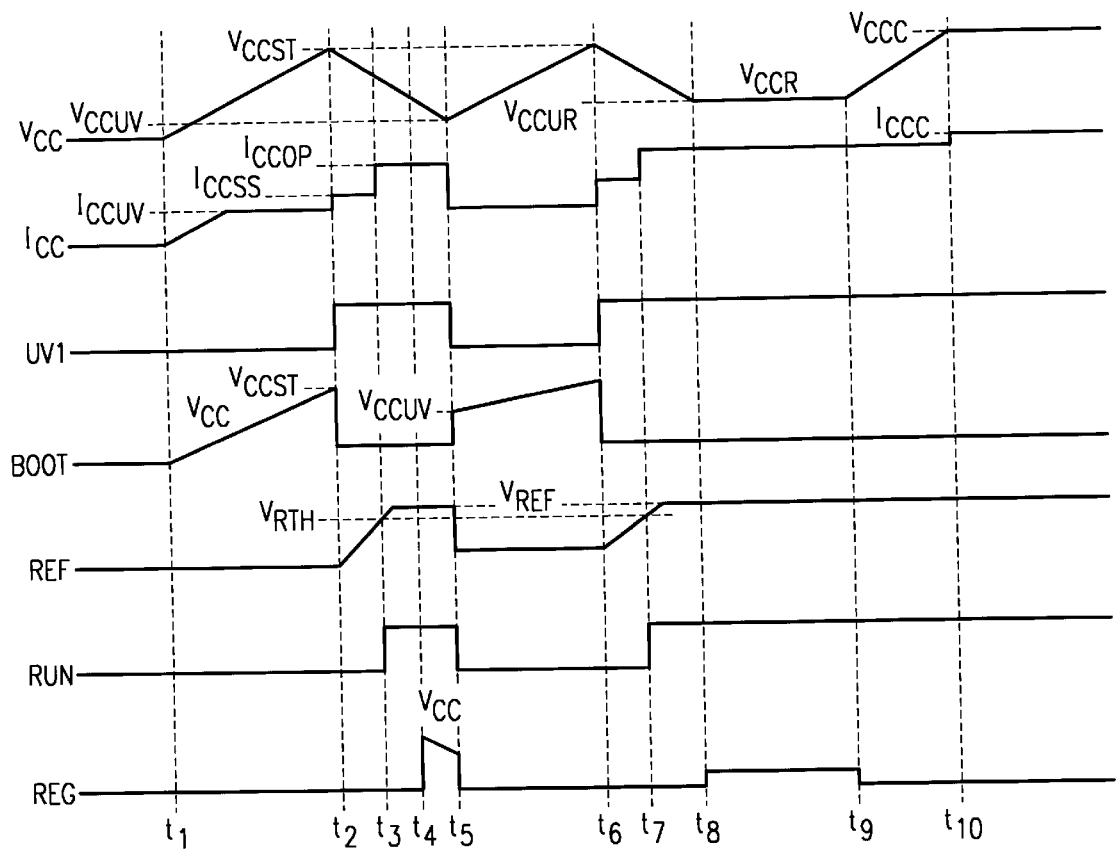
FIG. 14 illustrates the slave controller undervoltage lock-out function (UVLO 420) waveforms and timing during the power-up of slave controller 142.

FIG. 14 is an illustration of the voltages and currents of slave controller 142 during start-up and subsequently during the regulation of the supply voltage and REF. Referring to FIG. 14 at FIG. 3, upon power up at time t1, BOOT, the signal that drives the gate of transistor 264, which thereby connects the voltage supply to bleed resistor of resistor 206 and resistor 210, gradually ramps upward from time ti until time t2. This increasing gate voltage on transistor 264, decreases the drain-source voltage of transistor 264, thereby allowing the supply voltage, $V_{CC}$, to ramp toward the $V_{CC}$ startup voltage, $V_{CCST}$, at time t2. As noted from FIG. 14, $I_{CC}$, initially zero at T1, ramps upward to $I_{CCSB}$, the supply standby current. Also, as can be seen from FIG. 14, the RUN signal, the UV1 signal, the REG signal, and the REF signal are all held low during time t1 to time t2. $V_{CCUR}$ is the undervoltage threshold of voltage regulator 422. REG remains low until the supply voltage, $V_{CC}$, goes below $V_{CCUR}$. As can be seen from FIG. 14, this occurs at time t4 at which time REG attempts to regulate the supply voltage by asserting a positive value. When $V_{CC}$ reaches $V_{CCST}$ at time t2, the UV1 signal is asserted by UVLO 300, thereby enabling reference regulator 422 and pulling BOOT low.

When the UV1 signal is asserted at time t2, REF ramps upward from time t2 to time t3 until it reaches its threshold voltage, $V_{RTH}$. Upon this occurrence, the RUN signal is asserted, thereby fully enabling the functions of slave controller 142. Also in FIG. 14 at time t3 when RUN is asserted, $I_{CC}$ reaches $I_{CCOP}$, the operating current of slave controller 142. At time t3, slave controller 142 has achieved power-up. The time period from time t2 to time t5 represents a fault in external circuitry which allows the supply voltage to drop from $V_{CCST}$ to its undervoltage threshold, $V_{CCUV}$. As previously mentioned REG attempts to regulate $V_{CC}$ when $V_{CC}$ drops to $V_{CCUR}$; however, as shown in FIG. 14, REG is unsuccessful in doing this from time t4 to time t5. Therefore, at time t5, $V_{CC}$ drops to $V_{CCUV}$, thereby initiating reset of the power up. At time t8, power up has been successfully completed, whereby $V_{CC}$ is operating at $V_{CCR}$, the ideal regulated voltage of $V_{CC}$. From time t9 to time t10, a fault in external circuitry causes the supply voltage, $V_{CC}$, to ramp upward until it reaches $V_{CCC}$, the maximum input voltage allowed. $I_{CCC}$ is the maximum supply current limit.

Figure 15:
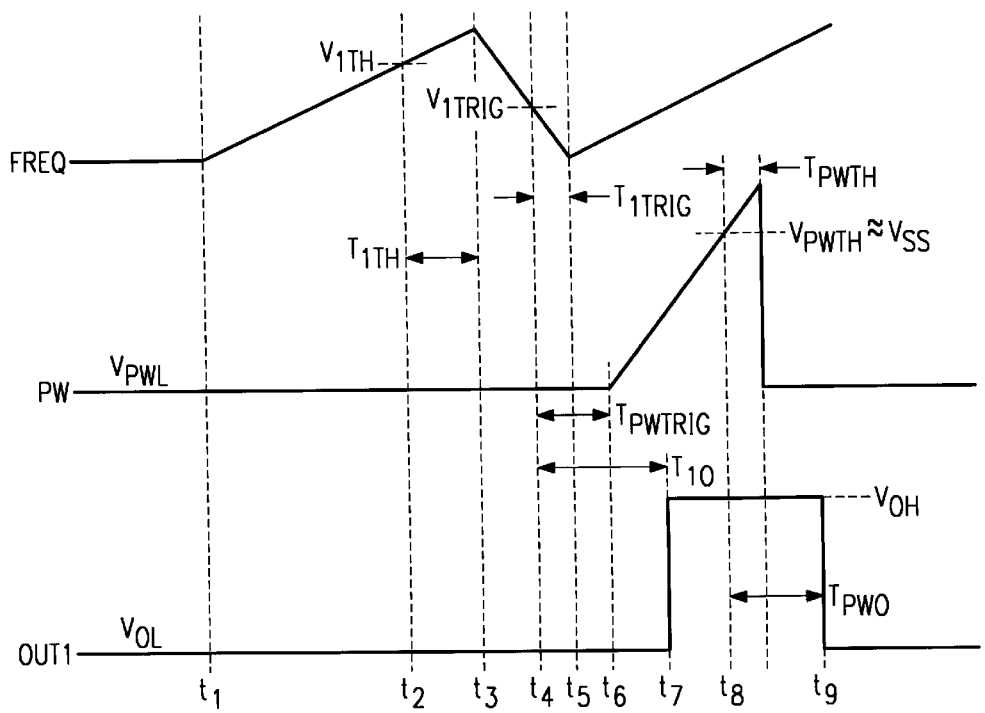
FIG. 15 illustrates the timing of oscillator 456.

FIG. 15 illustrates the timing of oscillator 456. At time t1, capacitor 240 begins to charge; therefore, FREQ ramps upward from time t1 until time t2. At time t2 FREQ reaches its upward threshold voltage $V_{FTH}$. The time for FREQ to go from its threshold voltage, $V_{FTH}$, to its peak value at time t3 is equal to $T_{FTH}$. At time t4 FREQ begins to fall to its lower threshold level $V_{FTRIG}$, thereby triggering startup latch 462. At time t5, after a propagation delay $T_{FTRIG}$, FREQ once again ramps upward as capacitor 240 begins to charge again. OUT2 is asserted at time t7, after a propagation delay $T_{FO}$ from time t4 when FREQ reaches the oscillator 456 trigger voltage, $V_{FTRIG}$. At time t8 PW reaches $V_{PWTH}$ which is approximately equal at this time to SS. At time t8 the output of PW comparator 364 is asserted; however, capacitor 257 is not discharged until after a propagation delay, $T_{PWTH}$. Furthermore, OUT2 is not negated until time t9 which consists of a propagation delay $T_{PWO}$ from time t8 when PW reaches its threshold voltage, $V_{PWTH}$.

Figure 16:
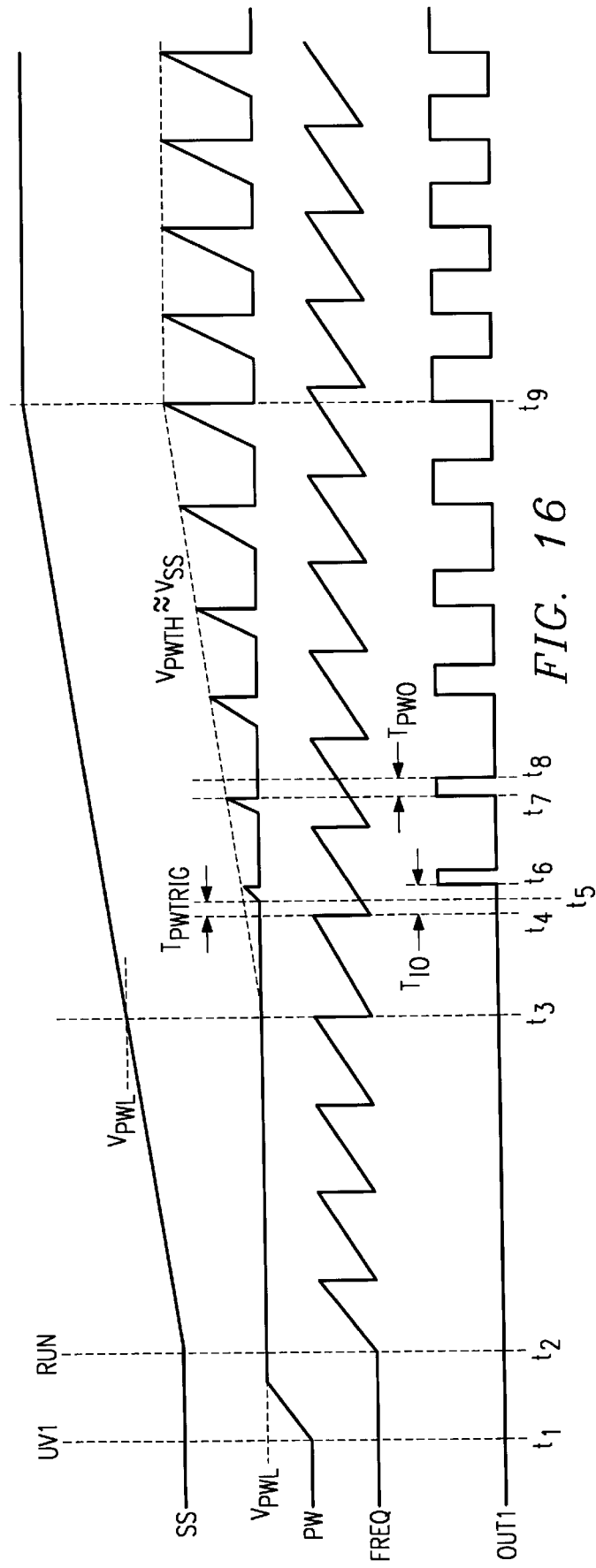
FIG. 16 illustrates the start-up ramp timing of slave controller 142.

FIG. 16 illustrates the "soft start" of START-UP WAVEFORM generated by slave controller 142. This signal appears at OUT1 until master controller 144 achieves power up. As can be seen from FIG. 16, after the RUN signal is asserted at time t2, the duty cycle of OUT2 gradually increases over time until it reaches its maximum duty cycle at time t9, thereby completing the soft start. Accordingly, the self start voltage, SS, begins ramping upward at time t2 until it reaches its steady state value at time t9. PW, the pulse width voltage, begins ramping upward up at time t1; however, PW does not exceed $V_{PWL}$ until SS reaches $V_{PWL}$ at time t3. After this occurrence, OUT1 is asserted. As can be seen from FIG. 16, after a propagation delay $T_{PWTRIG}$ from the falling edge of the FREQ signal, PW begins ramping upward until it reaches SS. OUT1 then goes low after a propagation delay of $T_{PWO}$. This is shown in FIG. 16 during time t7 to time t8. Also shown in FIG. 8 is the propagation delay $T_{FO}$ which is the period from time t4 at which FREQ has a falling edge until OUT1 is asserted at time t6. At time t9 when SS reaches its steady state value, OUT1 has its maximum on-time, thereby completing the soft start.

Figure 17:
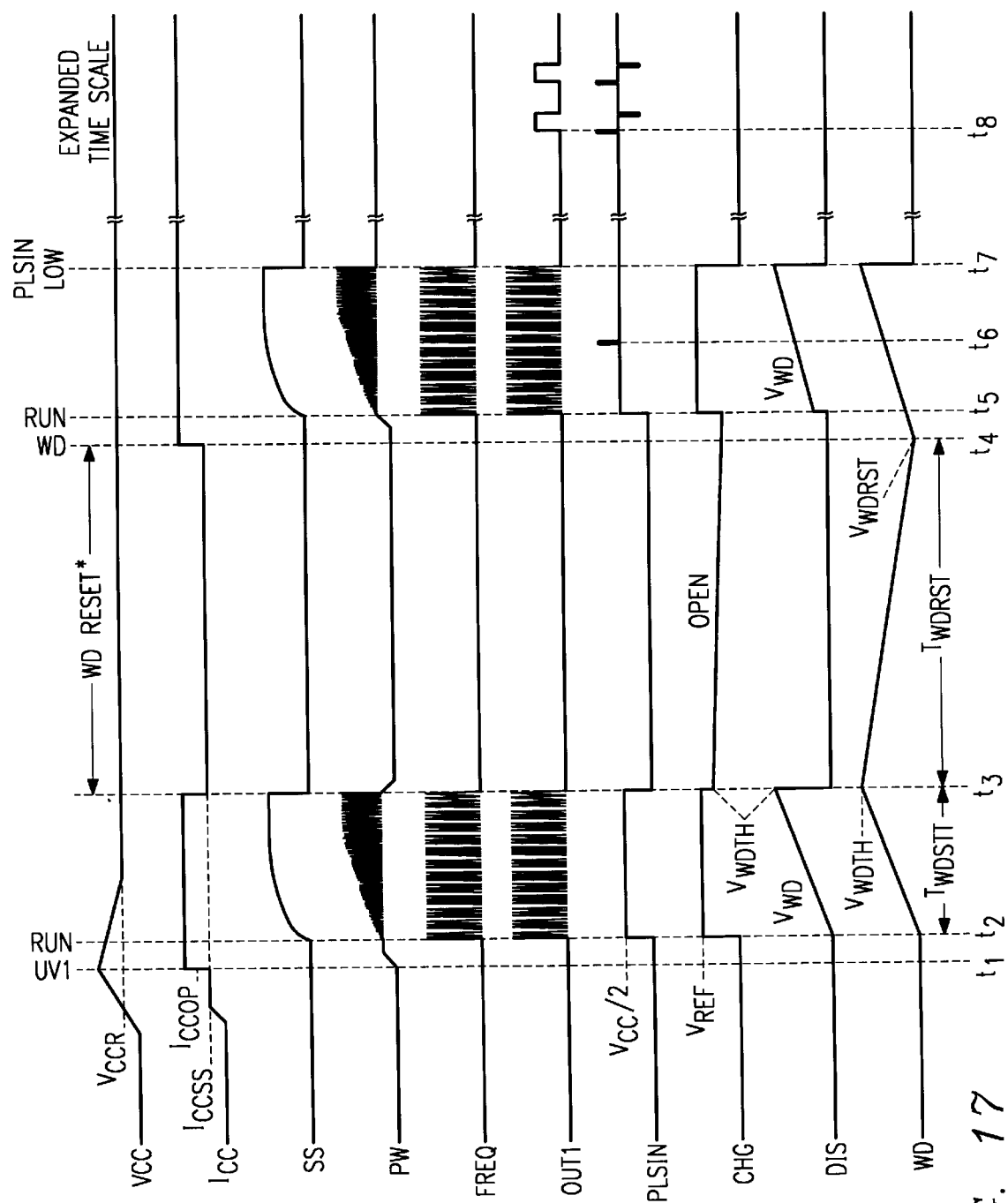
FIG. 17 illustrates the watchdog function 470 of slave controller 142.

FIG. 17 illustrates the watch dog operation of slave controller 142. As shown in FIG. 17, at time t1 UVLO 300 asserts the UV1 signal; therefore, PW rises to its lower limit, $V_{PWL}$. At time t2, UVLO 300 asserts the RUN signal, and pulses begin to appear at OUT1. Also shown in FIG. 17 is the DC bias voltage of PLSIN which is $V_{CC}/2$. Time t2 to time t3 constitutes the watchdog timeout period for the start-up of master controller 144. Time t3 to time t4 constitutes the watchdog reset period. At time t4, start-up is reinitiated. From time t3 to time t4 the watchdog circuit 370 (see FIG. 7) holds startup section 350 in reset. Referring to FIG. 17 and FIG. 7, initially capacitor 248 has no charge; therefore, WD is equal to zero volts at time t2. During the start-up cycle beginning at time t2, WD begins to ramp upward, whereby capacitor 248 starts to charge. WD ramps upward until it reaches its watchdog threshold voltage, $V_{WDTH}$, at time t3. At time t3, the watchdog reset is then initiated, thereby discharging capacitor 248 and lowering WD until WD reaches its lower threshold limit, $V_{WDRST}$, the watchdog reset threshold value, at t4.

Figure 18:
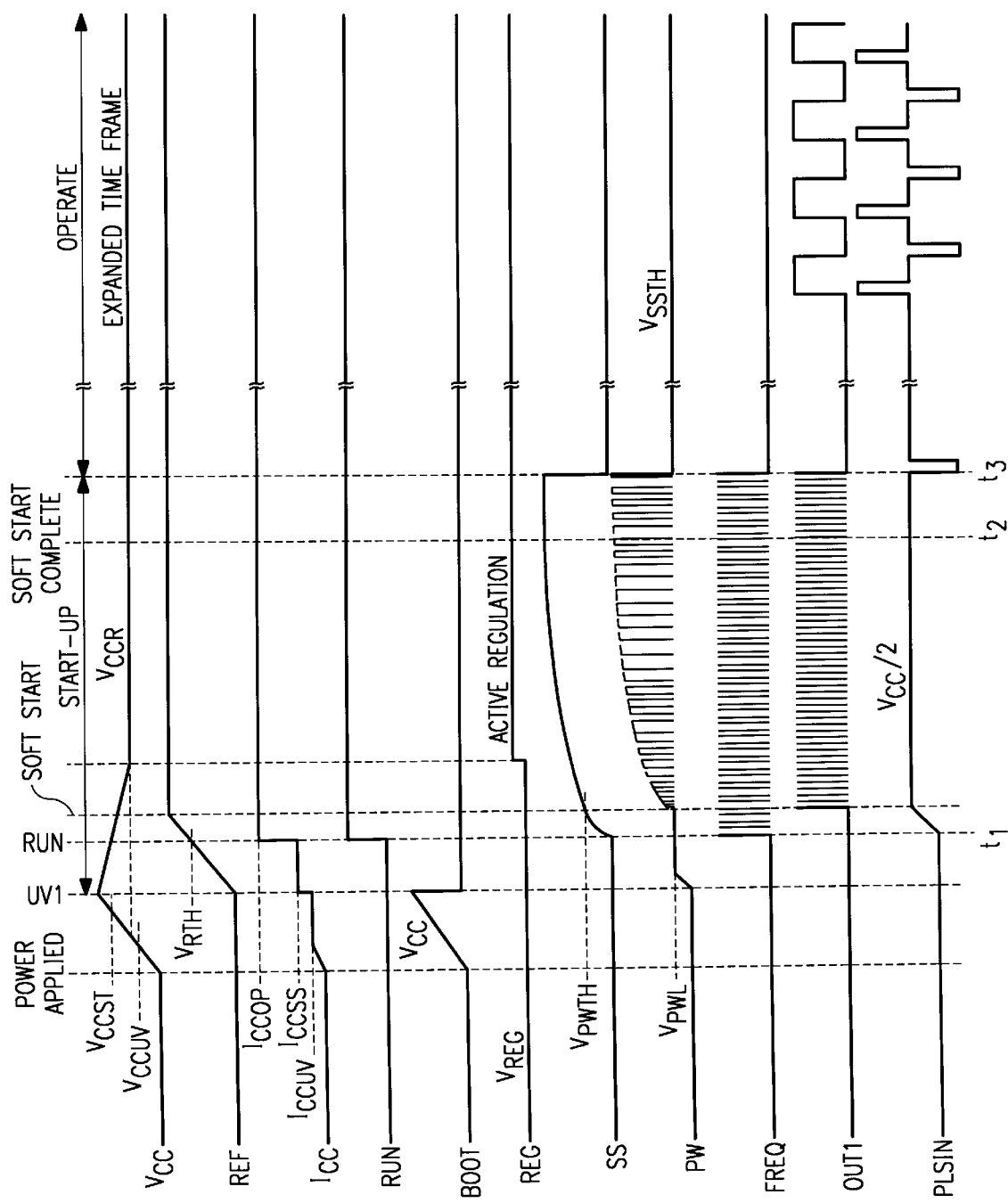
FIG. 18 illustrates the normal power-up, start-up and operation modes of slave controller 142.

FIG. 18 illustrates all three phases of the slave controller 142: power-up, start-up and operate. At time t1, the RUN signal is asserted, thereby ending the power up cycle of the slave controller 142. Thus, the start up of master controller 144 begins at time t1 with the soft start portion of the start-up cycle reaching its completion at time t2. The start-up cycle then continues until time t3 at which time a pulsed PLS− signal is detected at the PLSIN input. As discussed earlier, when the PLS+ and the PLS− outputs of master controller 144 are connected differentially, a pulsed PLS-signal is negative as compared to a pulsed PLS+ signal. The pulsed PLS− signal terminates the startup cycle of slave controller 142, thereby communicating to slave controller 142 that master controller 144 has powered up. From time t3 on, the output of slave controller 142, as shown in FIG. 18, is controlled through the PLSIN input to slave controller 142, thereby generating REPEATER WAVEFORM which appears as OUT1.

Some other design features in the presently preferred embodiment described above include the following:

The presently preferred embodiment includes a bootstrap relation which lets the primary high-voltage source supply the VCC power during the start-up phase, and then disconnects this input-derived power supply.

The presently preferred embodiment includes a self-regulating relationship wherein the primary regulates its own VCC supply.

On the primary side, the control signals from the secondary are received at a sensitive high-impedance input, so that a positive pulse is translated to a "start" command, and a negative pulse is translated to an "end" command.

The pulse transformer is preferably quite small; for example it may use a magnetic element which is as small as 0.14 inches in diameter, by 0.05 inches high.

The primary-side circuitry, in the presently preferred embodiment, includes a watchdog timer to initiate start-up.

The primary, in the presently preferred embodiment, uses a soft-start control relationship, where it starts at zero pulse width and then gradually increases to the programmed maximum pulse width.

The presently preferred embodiment uses a pulse generator in the secondary which generates bipolar pulses for communication back to the primary, without using a negative supply. (This is achieved by using switches to selectably reverse the terminals of the pulse output.)

The presently preferred embodiment uses a non-dissipative method of simulating current consumption without sensing current (which would be dissipative).

The presently preferred embodiment provides logarithmic bias to the ramp generator, to get constant power output under variable frequency operation. This idea is described in co-pending U.S. application Ser. No.

08/617,597, now U.S. Pat. No. 5/680,036, (Attorney's docket P-850), which is hereby incorporated by reference. In the presently preferred embodiment, bootstrap control for start-up operation is also provided on the secondary side. See U.S. Pat. No. 5,459,652, which is hereby incorporated by reference.

The presently preferred embodiment uses a sample and hold relationship, so that the value of $V_{in}$ is sampled during an on state, and this value is subsequently used during the off cycle to provide a control relationship during the off cycle.

Figure 19:
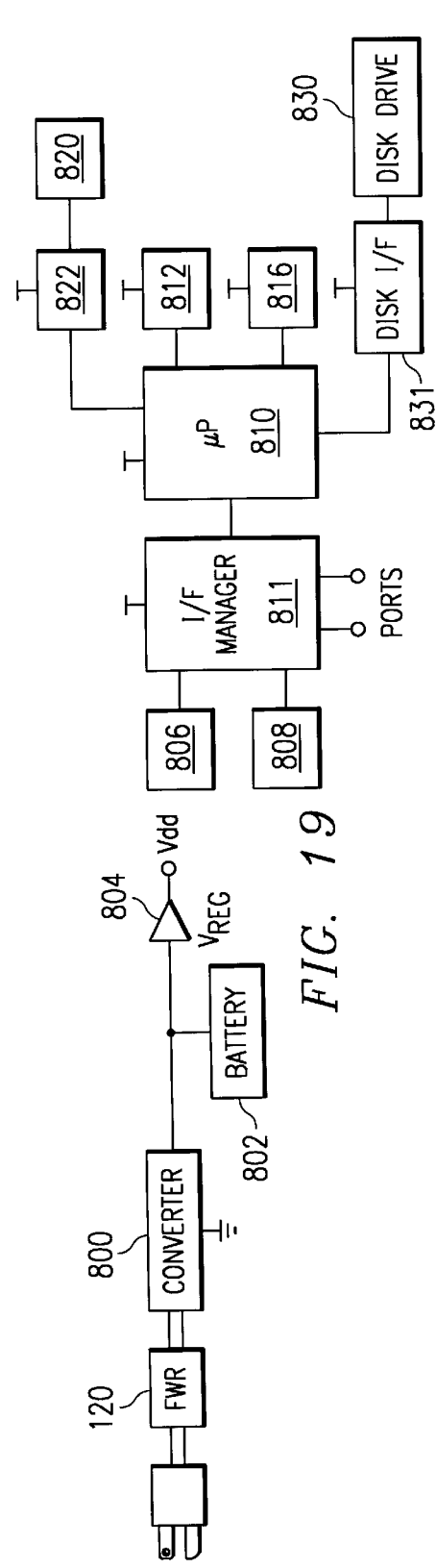
FIG. 19 shows a portable computer including a power supply as in FIG. 1.

FIG. 19 shows a portable computer including a power converter 800 as in FIG. 1, which is used to charge the battery 802. The power converter is connected, through a full-wave bridge rectifier 120, to draw power from AC mains, and is connected to provide a DC voltage to the battery. The battery 802 (or the converter 800), connected through a voltage regulator 804, is able to power the complete portable computer system, which includes. in this example:

user input devices (e.g. keyboard 806 and mouse 808);

at least one microprocessor 810 which is operatively connected to receive inputs from said input device, through an interface manager chip 811 (which also provides an interface to the various ports);

memory (e.g. flash memory 812 and RAM 816), which is accessible by the microprocessor;

a data output device (e.g. display 820 and display driver card 822) which is connected to output data generated by microprocessor; and a magnetic disk drive 830 which is read-write accessible, through an interface unit 831, by the microprocessor 810.

Optionally, of course, many other components can be included, and this configuration is not definitive by any means.

According to a disclosed class of innovative embodiments, there is provided:A circuit, comprising: first and second power transistors connected to turn on and turn off together; a voltage-sensing stage which is operatively connected, through current-carrying terminals of said second transistor, to sense the voltage across current-carrying terminals of said first transistor; said voltage-sensing stage being implemented in at least one device technology which is not used in said first transistor; whereby said second transistor protects said voltage-sensing stage from voltages which may appear on said first transistor when said first transistor is off.

According to another disclosed class of innovative embodiments, there is provided a circuit, comprising: first and second power transistors having respective control terminals thereof operatively connected in common; a voltage-sensing stage having at least one input thereof operatively connected through current-carrying terminals of said second transistor to one of at least two current-carrying terminals of said first transistor, said voltage-sensing stage being connected to detect zero-crossings in the voltage across said current-carrying terminals of said first transistor when said transistors are both on; said transistors both being implemented in a device technology which is not used in said voltage-sensing stage; whereby said second transistor protects said voltage-sensing stage from voltages which may appear on said first transistor when said first transistor is off.

According to another disclosed class of innovative embodiments, there is provided a computer system, comprising: memory, and a microprocessor operatively connected to read and write said memory; a graphics controller connected to said microprocessor; a video display connected to said graphics controller; and first and second power transistors connected to turn on and turn off together; a voltage-sensing stage which is operatively connected, through current-carrying terminals of said second transistor, to sense the voltage across current-carrying terminals of said first transistor; said voltage-sensing stage being implemented in at least one device technology which is not used in said first transistor; whereby said second transistor protects said voltage-sensing stage from voltages which may appear on said first transistor when said first transistor is off.

Modifications and Variations

The foregoing disclosure and description of the inventions are illustrated and explanatory thereof, and various changes in the size, shape, materials, components, circuit elements, wiring connection and contacts as well as in the details of the illustrated circuitry and construction may be made without departing from the spirit and scope of the invention.

For example, as will be obvious to those of ordinary skill in the art, other circuit elements can be added to, or substituted into, the specific circuit topologies shown.

For another example, within the constraints well-known to those of ordinary skill, power MOS transistors can be replaced by IGBT and/or MCT devices, with appropriate allowance for reduced turn-off times. In some applications power bipolar devices can also be used.

Also, while the preferred implementation uses an output diode parallel with the switching transistor in the secondary, it is alternatively possible to use only the switching transistor and not the output diode. However, this requires more precise control of switching, and is not preferred. The secondary-side switch is preferably turned on whenever the output diode would have gone into conduction (if the switch were not turned on), but alternatively other timing relations can be used instead.

Preferably the switch on the input side is turned back on after its voltage has been reduced by at least 50% (and more preferably by 90%; however, the timing can easily be adjusted if desired, using the innovations described, to further reduce the voltage at turn-on.

As will be recognized by those skilled in the art, the innovative concepts described in the present application can be modified and varied over a tremendous range of applications, and accordingly the scope of patented subject matter is not limited by any of the specific exemplary teachings given, but is only defined by the issued claims.

For example, as will be obvious to those of ordinary skill in the art, other circuit elements can be added to, or substituted into, the specific circuit topologies shown.

For another example, within the constraints well-known to those of ordinary skill, the power MOS transistors can be replaced (less preferably) by power field-effect transistors. Since the I/V characteristics of a saturated bipolar transistor are not linear overall, such a transistor will not provide a linear "resistance"; but the voltage drop will still show zero-crossings of the current.

Similarly, the power MOS transistors can also be replaced (less preferably) by power IGBT devices, with appropriate allowance for reduced turn-off speed), or other analogous power device technologies.

What is claimed is:

1. A circuit, comprising:

first and second power transistors connected to turn on and turn off together;

a first voltage-sensing stage which is operatively connected, through current-carrying terminals of said second transistor, to sense the voltage across current-carrying terminals of said first transistor;

said first voltage-sensing stage being implemented without a type of transistor of said first transistor;

wherein said first transistor is connected to interrupt a load current;

whereby said second transistor protects said first voltage-sensing stage from voltages which may appear on said first transistor when said first transistor is off.

2. The circuit of claim 1, wherein said first power transistor is a field-effect transistor.

3. The circuit of claim 1, further comprising a motor controller connected to selectively turn on said first power transistor.

4. The circuit of claim 1, further comprising a heating means connected to be controlled by said first power transistor, and a control means connected to selectively turn on said first power transistor.

5. The circuit of claim 1, further comprising a transmitting device operatively connected to said first power transistor.

6. The circuit of claim 1, further comprising a power transformer connected to power a computer system.

7. The circuit of claim 1, wherein said first power transistor and said second power transistor are operatively connected to said first voltage-sensing stage on a secondary side of a transformer.

8. The circuit of claim 1, wherein said first power transistor and said second power transistor are vertical DMOS devices.

9. The circuit of claim 1, wherein said first voltage-sensing stage is on a secondary side of said transformer and operates as a master in a master-slave relationship with a second voltage-sensing stage on a primary side of said transformer.

10. The circuit of claim 1, wherein said first voltage-sensing stage is on a secondary side of a transformer and communicates with a second voltage-sensing stage on a primary side of said transformer, through a pulse transformer which is separate from said transformer.

11. The circuit of claim 1, wherein a second voltage-sensing stage on a primary side of a transformer turns a switch on or off in response to commands sent from said first voltage-sensing stage.

12. A circuit, comprising:

first and second power transistors having respective control terminals thereof operatively connected in common;

a first voltage-sensing stage having at least one input thereof operatively connected through current-carrying terminals of said second transistor to one of at least two current-carrying terminals of said first transistor, said first voltage-sensing stage being connected to detect zero-crossings in the voltage across said current-carrying terminals of said first transistor when said transistors are both on;

said transistors both being implemented without a type of transistor of said first voltage-sensing stage;

wherein said first transistor is connected to interrupt a load current;

whereby said second transistor protects said first voltage-sensing stage from voltages which may appear on said first transistor when said first transistor is off.

13. The circuit of claim 12, wherein said first power transistor is a field-effect transistor.

14. The circuit of claim 12, further comprising a motor controller connected to selectively turn on said first power transistor.

15. The circuit of claim 12 further comprising a heating means connected to be controlled by said first power transistor, and a control means connected to selectively turn on said first power transistor.

16. The circuit of claim 12, further comprising a transmitting device operatively connected to said first power transistor.

17. The circuit of claim 12, further comprising a power transformer connected to power a computer system.

18. The circuit of claim 12, wherein said first power transistor and said second power transistor are operatively connected to said first voltage-sensing stage which is on a secondary side of a transformer.

19. The circuit of claim 12, wherein said first power transistor and said second power transistor are vertical DMOS devices.

20. The circuit of claim 12, wherein said first voltage-sensing stage is on a secondary side of a transformer and operates as a master in a master-slave relationship with a second voltage-sensing stage on a primary side of said transformer.

21. The circuit of claim 12, wherein said first voltage-sensing stage on a secondary side of a transformer communicates with a second voltage-sensing stage on a primary side of said transformer through a pulse transformer which is separate from said transformer.

22. The circuit of claim 12, wherein a second voltage-sensing stage is on a primary side of a transformer and turns a switch on or off in response to commands sent from said second voltage-sensing stage.

23. A computer system, comprising:

memory, and a microprocessor operatively connected to read and write said memory;

a graphics controller connected to said microprocessor;

a video display connected to said graphics controller; and a power supply, comprising first and second power transistors connected to turn on and turn off together;

a voltage-sensing stage which is operatively connected, through current-carrying terminals of said second transistor, to sense the voltage across current-carrying terminals of said first transistor; said voltage-sensing stage being at least partly implemented using a device type different from that of said first transistor;

wherein said first transistor is connected to interrupt a load current;

whereby said second transistor protects said voltage-sensing stage from voltages which may appear on said first transistor when said first transistor is off.

24. The system of claim 23, wherein said first power transistor and said second power transistor are operatively connected to said first voltage-sensing stage which is on a secondary side of a transformer.

25. The system of claim 23, wherein said first power transistor and said second power transistor are vertical DMOS devices.

26. The system of claim 23, wherein said first voltage-sensing stage is on a secondary side of a transformer and operates as a master in a master-slave relationship with a second voltage-sensing stage on a primary side of said transformer.

27. The system of claim 23, wherein said first voltage-sensing stage is on a secondary side of a transformer and communicates with a second voltage-sensing stage on a primary side of said transformer through a pulse transformer which is separate from said transformer.

28. The system of claim 23, wherein a second voltage-sensing stage is on a primary side of a first transformer and turns a switch on or off in response to commands sent from said first voltage-sensing stage.

29. A method for zero-crossing detection of currents in power circuits, comprising the steps of:
(a.) isolating a first power transistor from a first voltage-monitoring circuit with a second power transistor, which is switched on only when said first power transistor is switched on; said first power transistor also being used for switching a load current; and
(b.) when said second power transistor is on, detecting zero-crossings of said load current by detecting zero-crossings of a voltage on an on-resistance of said first power transistor, using said first voltage-monitoring circuit.

30. The method of claim 29, wherein said first power transistor and said second power transistor are operatively connected to said first voltage-monitoring circuit on a secondary side of a transformer.

31. The method of claim 29, wherein said first voltage-monitoring circuit on a secondary side of a transformer operates as a master in a master-slave relationship with a second voltage-monitoring circuit on a primary side of said transformer.

32. The method of claim 29, wherein said first voltage-monitoring circuit operatively connected on a secondary side of a transformer communicates with a second voltage-monitoring circuit on a primary side of said transformer, through a pulse transformer.

33. The method of claim 29, wherein said first power transistor and said second power transistor are vertical DMOS devices.

34. A circuit for zero-crossing detection of currents in power circuits, comprising:
means for isolating a first power transistor from a first voltage-monitoring circuit with a second power transistor, which is switched on only when said first power transistor is switched on;
said first power transistor also being connected to switch a load current; and
means for detecting zero-crossings of said load current by detecting zero-crossings of a voltage on an on-resistance of said first power transistor, using said first voltage-monitoring circuit, when said second power transistor is on.

35. The circuit of claim 34, wherein said first power transistor and said second power transistor are operatively connected to said first voltage-monitoring circuit on a secondary side of a transformer.

36. The circuit of claim 34, wherein said first voltage-monitoring circuit on said secondary side of a transformer operates as a master in a master-slave relationship with a second voltage-monitoring circuit on a primary side of said transformer.

37. The circuit of claim 34, wherein said first voltage-monitoring circuit operatively connected on a secondary side of a transformer communicates with a second voltage-monitoring circuit on a primary side of said transformer, through a pulse transformer.

38. The circuit of claim 34, wherein said first power transistor and said second power transistor are vertical DMOS devices.

* * * * *